(12) United States Patent
Ward et al.

(10) Patent No.: US 12,410,595 B2
(45) Date of Patent: Sep. 9, 2025

(54) SYSTEM AND METHOD FOR ASSEMBLING AND/OR OPERATING CONTROL SWITCH IN RELATION TO WASTE DISPOSER AND IN RELATION TO ALTERNATIVE ELECTRIC POWER SOURCES

(71) Applicant: Emerson Electric Co., St. Louis, MO (US)

(72) Inventors: Jeffrey Ward, Kenosha, WI (US); Kelly T. Gamble, Waterford, WI (US); Dane Hofmeister, Mount Pleasant, WI (US)

( * ) Notice: Subject to any disclaimer, the term of this patent is extended or adjusted under 35 U.S.C. 154(b) by 596 days.

(21) Appl. No.: 17/885,824

(22) Filed: Aug. 11, 2022

(65) Prior Publication Data
US 2024/0052618 A1  Feb. 15, 2024

(51) Int. Cl.
*E03C 1/266* (2006.01)
*B02C 18/00* (2006.01)
(Continued)

(52) U.S. Cl.
CPC ........ *E03C 1/2665* (2013.01); *B02C 18/0092* (2013.01); *H01R 13/639* (2013.01); *H02K 5/225* (2013.01); *B02C 23/36* (2013.01)

(58) Field of Classification Search
CPC . B02C 18/0092; B02C 18/0084; B02C 23/36; E03C 1/266; E03C 1/2665
See application file for complete search history.

(56) References Cited

U.S. PATENT DOCUMENTS 2,244,402 A   6/1941  Powers
2,477,686 A   8/1949  Coss
(Continued)

FOREIGN PATENT DOCUMENTS

CN    204753748    11/2015
CN    205617508    10/2016
(Continued)

OTHER PUBLICATIONS

International Search report and Written Opinion for International Application No. PCT/US2023/029927 from WIPO dated Nov. 30, 2023 (15 pages).

*Primary Examiner* — Bobby Yeonjin Kim
(74) *Attorney, Agent, or Firm* — BROOKS KUSHMAN P.C.

(57) ABSTRACT

Waste disposer systems and cover switch mechanisms for implementation in such systems, and related methods, are disclosed. In an example embodiment, a cover switch mechanism includes a cord, a body configured to be coupled to a top portion of a disposer, and connecting components. The connecting components include a terminal cover configured to be coupled to a bottom portion of the disposer, a switch interface connector, and a connection component. The cord extends between the body and cover, where an end of the cord extending into the cover includes first and second leads. The first lead is coupled to the interface connector, and the cover is configured to receive a second end of a power link. The interface connector is configured to be coupled to a third lead of the link, and the connection component is configured to couple the second lead with a fourth lead of the link.

18 Claims, 17 Drawing Sheets

(51) Int. Cl.
  *B02C 23/36* (2006.01)
  *H01R 13/639* (2006.01)
  *H02K 5/22* (2006.01)

(56) References Cited

U.S. PATENT DOCUMENTS

| | | | |
|---|---|---|---|
| 2,579,400 A | 12/1951 | Schindler | |
| 2,642,232 A * | 6/1953 | Drew | E03C 1/2665 |
| | | | 241/46.016 |
| 2,657,397 A * | 11/1953 | Drew | E03C 1/2665 |
| | | | 241/46.016 |
| 2,850,244 A * | 9/1958 | James | E03C 1/2665 |
| | | | 241/32.5 |
| 2,860,834 A | 11/1958 | Hammes | |
| 2,961,172 A | 11/1960 | Wieczorek et al. | |
| 2,979,274 A * | 4/1961 | Tull | E03C 1/2665 |
| | | | 285/31 |
| 3,425,637 A | 2/1969 | Enright et al. | |
| 3,464,638 A | 9/1969 | Enright et al. | |
| 3,504,863 A | 4/1970 | Burkland et al. | |
| 6,082,643 A | 7/2000 | Kovacs | |
| 7,503,514 B2 | 3/2009 | Berger et al. | |
| 7,757,981 B2 | 7/2010 | Anderson et al. | |
| 9,145,666 B2 | 9/2015 | Hammer | |
| 9,968,940 B2 | 5/2018 | Hartmann et al. | |
| 10,981,178 B2 | 4/2021 | Britto | |
| 11,441,302 B2 | 9/2022 | Reidel et al. | |
| 11,532,909 B2 * | 12/2022 | Weaver | H01R 4/48 |
| 2004/0178289 A1 | 9/2004 | Jara-Almonte et al. | |
| 2006/0038047 A1 | 2/2006 | Anderson et al. | |
| 2021/0087801 A1 * | 3/2021 | Ward | H01R 13/73 |
| 2021/0238834 A1 * | 8/2021 | Ward | H01R 25/006 |
| 2022/0120069 A1 * | 4/2022 | Reidel | B02C 18/0092 |

FOREIGN PATENT DOCUMENTS

| | | |
|---|---|---|
| GB | 2392636 B | 3/2004 |
| JP | 4968711 B2 | 7/2012 |
| WO | 2007056631 A2 | 5/2007 |

* cited by examiner

SYSTEM AND METHOD FOR ASSEMBLING AND/OR OPERATING CONTROL SWITCH IN RELATION TO WASTE DISPOSER AND IN RELATION TO ALTERNATIVE ELECTRIC POWER SOURCES

FIELD

The present disclosure relates to waste disposers such as food waste disposers and, more particularly, to control systems for use in or in conjunction with such waste disposers, as well as to waste disposers comprising such control systems, and to methods of assembling and/or operating control systems in relation to waste disposers.

BACKGROUND

Food waste disposers are used to comminute food scraps into particles small enough to pass through household drain plumbing. Some food waste disposers have operator-actuatable switching mechanisms in which the operator-actuatable switch is positioned at or near the top of the food waste disposer. Because the operator-actuatable switch is positioned at or near the top of the food waste disposer, a wire cable typically is provided that extends from the operator-actuatable switch to (or substantially to) the bottom of the food waste disposer, at which is located a motor (and possibly related control circuitry such as a start switch).

Although helpful for facilitating an operator's accessing of the switching mechanism, such conventional arrangements of operator-actuatable switching mechanisms are limiting in several respects. In particular, such conventional arrangements are typically highly specialized in that the arrangements are respectively configured to be implemented only in relation to respective types of food waste disposers, such that any given arrangement only can be implemented in regard to a particular food waste disposer model or type.

Further, such conventional arrangements of operator-actuatable switching mechanisms are typically configured for implementation in regard to only a single type of home installation circumstance. It will be appreciated that most newer homes have a standard electrical power outlet (e.g., a wall outlet) near the disposer, to which the disposer can be coupled so as to receive power, but nevertheless most older homes (pre-1970's) have a Romex/BX cable extending from a wall of the home, which can be coupled and terminated directly to the disposer in a hardwired manner. Out of all homes, it is estimated that 60% of homes with a disposer have hardwiring and that the remaining 40% use a power outlet located in the sink cabinet. Notwithstanding these different home installation circumstances, conventional arrangements of operator-actuatable switching mechanisms for food waste disposers are typically configured to be wired in relation to the food waste disposers in a manner that is specifically tailored for implementation of the food waste disposer in relation to only a particular home installation circumstance, such as the circumstance when a Romex/BX cable is present.

For at least one or more of these reasons, or one or more other reasons, it would be advantageous if improved switch mechanisms or systems for use in or in conjunction with food waste disposers or other disposers could be developed, and/or if improved food waste disposers or other disposers having or operating in conjunction with such mechanisms or systems could be developed, and/or if improved methods of assembling and/or operating such mechanisms, systems, or disposers could be developed, so as to address any one or more of the concerns discussed above or to address one or more other concerns or provide one or more benefits.

BRIEF SUMMARY

In at least some example embodiments, the present disclosure relates to a food waste disposer system. The food waste disposer system includes a food waste disposer including a motor, a switch module coupled to the motor and operable to control power to the motor, and a housing including a bottom housing portion and a top housing portion, where the switch module and motor are supported within the housing. Additionally, the food waste disposer system also includes a cover switch mechanism including a cover control switch cord, a primary body having at least one actuator and configured to be coupled to the top housing portion, and a plurality of connecting components. The plurality of connecting components include a terminal cover configured to be coupled to the bottom housing portion and a switch interface connector coupled to the terminal cover and also configured to be coupled to the switch module. Also, the cover control switch cord extends between the primary body and the terminal cover, where a first end of the cover control switch cord extending into the terminal cover includes first and second wire leads, and where the first wire lead is coupled to the switch interface connector. Additionally, the terminal cover is further configured to receive a second end of a power link therewithin, where the switch interface connector is configured to be coupled to at least one third wire lead of the power link, and where the second wire lead is configured to be coupled at least indirectly to a fourth wire lead of the power link.

Further, in at least some further example embodiments, the present disclosure relates to a cover switch mechanism for implementation with a waste disposer having a motor, a switch module coupled at least indirectly to the motor, and a housing including a bottom housing portion and a top housing portion, wherein the switch module and motor are supported within the housing. The cover switch mechanism includes a cover control switch cord, a primary body configured to be coupled to the top housing portion, and a plurality of connecting components. The plurality of connecting components includes a terminal cover configured to be coupled to the bottom housing portion, a switch interface connector coupled to the terminal cover and also configured to be coupled to the switch module, and a wire lead connection component. The cover control switch cord extends between the primary body and the terminal cover, where a first end of the cover control switch cord extending into the terminal cover includes first and second wire leads, and where the first wire lead is coupled to the switch interface connector. Also, the terminal cover is further configured to receive a second end of a power link therewithin, where the switch interface connector is configured to be coupled to at least one third wire lead of the power link, and where the wire lead connection component is configured to couple the second wire lead with a fourth wire lead of the power link.

Additionally, in at least some additional example embodiments, the present disclosure relates to a method of installing a food waste disposer system. The method includes providing the food waste disposer system to an installation environment, where the food waste disposer system includes a housing, a switch module, and a motor, where the switch module and motor are supported at least indirectly upon the housing. Also, the method includes providing a cover switch mechanism including a cover control switch cord, a primary body configured to be coupled to the top housing portion, and a plurality of connecting components, where the plurality of connecting components include a terminal cover configured to be coupled to the bottom housing portion, a switch interface connector, and a wire lead connection component. Further, the method includes causing the cover control switch cord and a power link respectively to extend between a first region exterior of the terminal cover and a second region within the terminal cover by way of first and second orifices, respectively, of the terminal cover, so that each of respective first ends of the cover control switch cord and the power link extends into the second region. Additionally, the method includes coupling respective first wire leads provided at the respective first ends of the cover control switch cord and the power link to respective ports of the switch interface connector, and coupling together, at least indirectly, respective second wire leads provided at the respective first ends of the cover control switch cord and the power link, respectively. Further, the method includes assembling a terminal assembly including the terminal cover, the switch interface connector, and the first ends of the cover control switch cord and the power link in relation to a bottom portion of the housing, where the assembling includes coupling the switch interface connector to the switch module, and connecting the primary body of the cover switch mechanism to a top portion of the housing.

BRIEF DESCRIPTION OF THE DRAWINGS

Embodiments of food waste disposer systems (or other waste disposer systems), food waste disposers, and/or systems (or subsystems) employed in or in conjunction with such waste disposer systems/waste disposers, and/or related methods, are disclosed with reference to the accompanying drawings and are for illustrative purposes only. The systems and methods encompassed herein are not limited in their applications to the details of construction, arrangements of components, or other aspects or features illustrated in the drawings, but rather such systems and methods encompassed herein include other embodiments or are capable of being practiced or carried out in other various ways. Like reference numerals are used to indicate like components. In the drawings.

DETAILED DESCRIPTION

Figure 1:
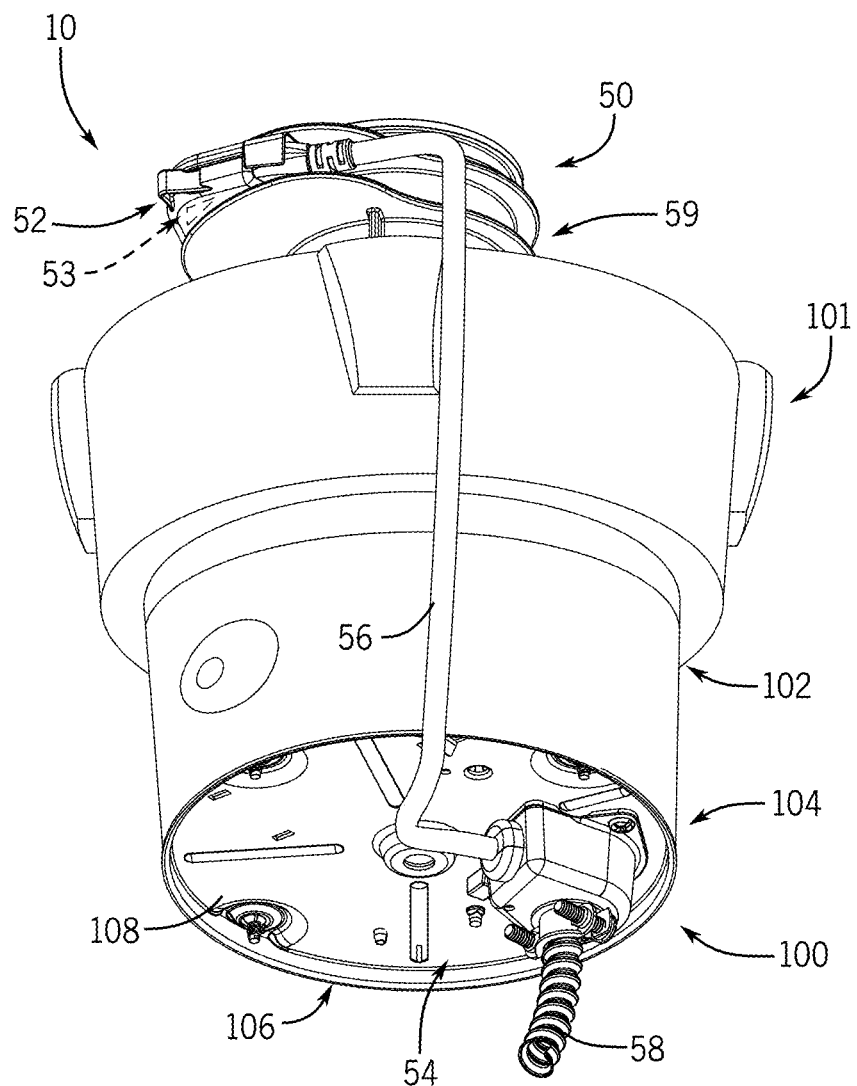
FIG. 1 is a bottom, substantially rear perspective view of a first example food waste disposer assembly including a first example food waste disposer assembled in combination with a first example cover control system, as can be installed in relation to another structure such as a sink, shown to be connected to a Romex/BX cable (shown in cutaway)

The present disclosure relates to and encompasses waste disposer systems and assemblies, such as food waste disposer assemblies, which are configured to be controlled by cover control mechanisms or systems (or subsystems). More particularly, in at least some embodiments, the present disclosure relates to food waste disposer assemblies having food waste disposers and cover control mechanisms, where the food waste disposers include motor sections at bottom ends (or at first ends) of the first waste disposers, and where the cover control mechanisms are mounted atop top ends (or at second ends) of the food waste disposers. Such a cover control mechanism for example can be provided in the form of a cover control kit, by which the cover control mechanism can be easily assembled in relation to a food waste disposer by a consumer. Such a cover control kit can be sold separately from the food waste disposer as a kit, or included along with the disposer (e.g., within the disposer box) when the disposer/disposer assembly is purchased by a consumer.

Additionally, the present disclosure envisions waste disposer assemblies in which the disposer assemblies including the cover control mechanisms can be assembled to receive electric power in any of several manners. More particularly, in at least some embodiments, the present disclosure relates to food waste disposer assemblies in which the food waste disposers, and additionally the cover control mechanism, can be coupled to receive electric power by each (or any) of a power cord that can be plugged into a wall outlet or other power source, or a Romex cable, or a BX hard covered wire. In at least some such embodiments, coupling of the food waste disposer assemblies to a Romex cable or BX hard covered wire can be achieved through implementation of a Romex/Bx connector. Additionally, in at least some embodiments, the present disclosure relates to a cover control mechanism (e.g., in the form of a cover control kit) that may be added to any of a variety of multiple different types of disposers, such that a consumer may pick or select a model of disposer from any of those different types of disposers and then apply/implement the cover control mechanism in relation to that selected disposer. The cover control mechanism is designed to include a connector by which the cover control mechanism may plug into the disposer, for any of the different types of disposers, so as to simplify installation of the cover control mechanism relative to the disposer.

The present disclosure envisions embodiments in which the waste disposer assembly is implemented by either corded installation, in which a cord associated with the waste disposer assembly can be plugged into an electric power (e.g., wall) outlet at the installation site, or hardwired installation, such that electric power can be delivered to the waste disposer assembly via a Romex/BX cable that is present at the installation site. That is, the present disclosure envisions that a given waste disposer assembly can include, or be implemented in conjunction with, a system (or system components) that enables the waste disposer assembly to be installed in either (or both) of two different manners relative to a surrounding environment such as a home installation site so that the given waste disposer assembly can be provided with electric power either by way of an electric power outlet or by way of a Romex/BX cable. Relatedly, the present disclosure envisions methods of installation of waste disposer assemblies according to which a waste disposer assembly can be installed in relation to a surrounding environment in either of two manners depending upon whether the waste disposer assembly is to receive electric power from an electric power outlet or via a Romex/BX cable.

Further, in at least some embodiments encompassed herein, the present disclosure relates to a disposer assembly having a lower end frame (LEF) and start switch, and a cover control mechanism, which are configured to facilitate coupling of the cover control mechanism to the disposer as well as to a power source by way of any of a power cord or Romex or BX cord or cable. In some such embodiments, the disposer assembly includes an arrangement by which the leads from a trigger switch (e.g., of the cover control mechanism) may be coupled to the start switch connector and also to the power cord leads, all within the same general area. Further, in some such embodiments, all of the wires are routed and connected into a new connector that mates with the start switch, as part of the LEF assembly.

More particularly, in at least some such embodiments encompassed herein, the disposer assembly is arranged in a manner according to which the two main cords—that is, the cord or cable with the leads from the cover control mechanism and also the cord or cable intended to link the disposer assembly with a power source (e.g., a Romex cable, BX hard covered cable, or power cord suited for being plugged into a wall outlet)—come into a junction box at different angles so the two cords can have individual strain reliefs. A new (two conductor) connector makes it possible to join the power leads within this small junction box. The junction box and new connector can be considered to be part of the cover control mechanism rather than the disposer, and this new cover control mechanism (or cover control kit) design resolves the interface to the new LEF and start switch and frees the customer from only having only one disposer model choice.

Figure 2:
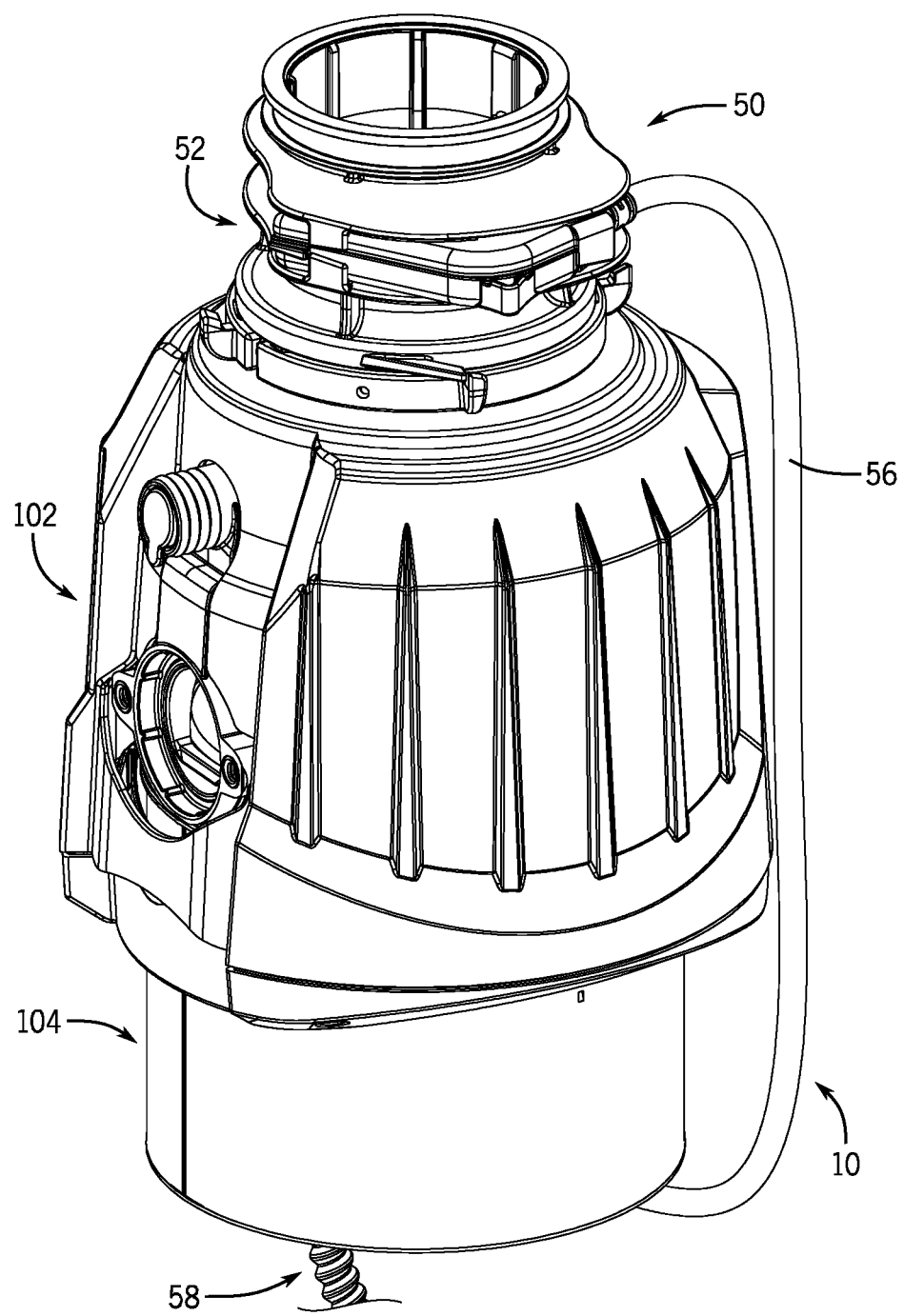
FIG. 2 is a top, substantially front perspective view of the first example food waste disposer assembly of FIG. 1, again shown to be connected to the Romex/BX cable (shown in cutaway)

Referring to FIGS. 1 and 2, a bottom, substantially rear perspective view and a top, substantially front perspective view, respectively, of a food waste disposer system or assembly 10 are shown, in accordance with a first example embodiment encompassed herein. As illustrated, the food waste disposer assembly 10 includes a food waste disposer 100 having an enclosure 102, a cylindrical stator band 104, and a lower end frame (LEF) 106 (see FIG. 1). In general, the food waste disposer 100 can be understood as including a food conveying section, a motor section, and a grinding section. The food conveying section is generally positioned at a location corresponding to the location of the enclosure 102, at or near the top of the food waste disposer 100. The motor section is generally positioned at a location corresponding to and within the stator band 104, at or near the bottom of the food waste disposer 100. The grinding section is disposed between the food conveying section and the motor section. It should be appreciated that the food conveying section includes an inlet for receiving food waste and fluid (e.g., water), and conveys the food waste to the grinding section. The motor section includes a motor 170 imparting rotational movement to a motor shaft to operate the grinding section. In the present example embodiment, the motor 170 can be an electric motor that is an inductive motor, although the present disclosure is intended to encompass embodiments of food waste disposers employing other types of motors such as permanent magnet motors.

In the present example embodiment, the food waste disposer assembly 10 also includes, in addition to the food waste disposer 100, a control switch mechanism 50. The control switch mechanism 50 is configured to allow for users to turn on, turn off, or otherwise actuate or control operation of the disposer in relation to which the control switch mechanism is implemented. In the present example, the control switch mechanism 50 is considered to be distinct from the food waste disposer 100, with the food waste disposer and control switch mechanism both being included as part of the food waste disposer assembly 10. However, in other embodiments or contexts, the control switch mechanism 50 can instead be considered to form a part of the food waste disposer 100 itself. The control switch mechanism 50 can be included with the food waste disposer 100 at the time of purchase of that food waste disposer 100 (or of the overall food waste disposer assembly 10), or can be obtained or purchased separately from the food waste disposer, as a cover control kit.

As shown, in the present embodiment, the control switch mechanism 50 includes a primary body 52, LEF connecting components 54 (see FIG. 1), and a cover control switch cord (or cable or wire) 56 linking the primary body 52 with the LEF connecting components 54. The primary body 52 is configured to be mounted atop or at the top end of the food waste disposer 100, along the cover of the food waste disposer. Due to this arrangement of the primary body 52, actuation switches (or other actuators) 53 of the control switch mechanism 50 provided in the primary body are more easily accessed by users/operators, and the control switch mechanism 50 can also be referred to as a cover control mechanism. The cover control switch cord 56 is connected to the primary body 52 of the control switch mechanism 50 arranged at the top end of the food waste disposer 100 (e.g., to an AV extension tube 59 at the top of the disposer), and is arranged to run downward from the primary body 52 along the outside of the food waste disposer and then to pass under the food waste disposer to the LEF connecting components 54. Arranged in this manner, the cover control switch cord 56 not only allows for the LEF connecting components 54 to be coupled to the primary body 52, but also allows for the LEF connecting components to be positioned along the LEF 106.

As will be described in further detail below, the positioning of the LEF connecting components 54 along the LEF 106 both facilitates coupling of the actuation switches (or other actuators) 53 of the primary body 52 of the control switch mechanism 50 to the motor section by way of the cover control switch cord 56, and also facilitates the coupling of those actuation switches and the motor section with a power source. In the present example embodiment shown in FIGS. 1 and 2, the LEF connecting components 54 are shown to be coupled to a Romex/BX cable 58, by which power is received from a power source. The Romex/BX cable 58 is intended to be representative of either a Romex cable or a BX hard covered wire, as can be preinstalled in some homes or facilities for delivery of power to a device such as the food waste disposer assembly 10. For purposes of the present description, the Romex/BX cable 58 is not considered to be a part of the food waste disposer assembly 10 although, in other contexts, the Romex/BX cable (or a portion of it, such as the portion nearby or coupled to the LEF connecting components 54) can be considered to be a part of the food waste disposer assembly.

Although the example embodiment of FIGS. 1 and 2 illustrates the LEF connecting components 54 as being coupled to the Romex/BX cable 58, the present example embodiment also is one that can accommodate implementation of a power cord having a plug that plugs into a wall outlet (e.g., a NEMA 5-15 plug), as will be additionally described below. That is to say, in the present embodiment, the LEF connecting components 54, and the food waste disposer assembly 10 overall, are configured to allow for either implementations in which a Romex/BX cable 58 is coupled to the LEF connecting components 54 to allow for the supplying of power to the food waste disposer assembly, or implementations in which a power cord 400 (see FIG. 22) is implemented in regard to the LEF connecting components 54 such that, upon the power cord also being plugged into a wall outlet, power can be supplied to the food waste disposer assembly 10. Again, for purposes of the present description, such a power cord (e.g., the power cord 400) is not considered to be a part of the food waste disposer assembly although, in other contexts, the power cord (or a portion of it, such as the portion nearby or coupled to the LEF connecting components 54) can be considered to be a part of the food waste disposer assembly.

Figure 3:
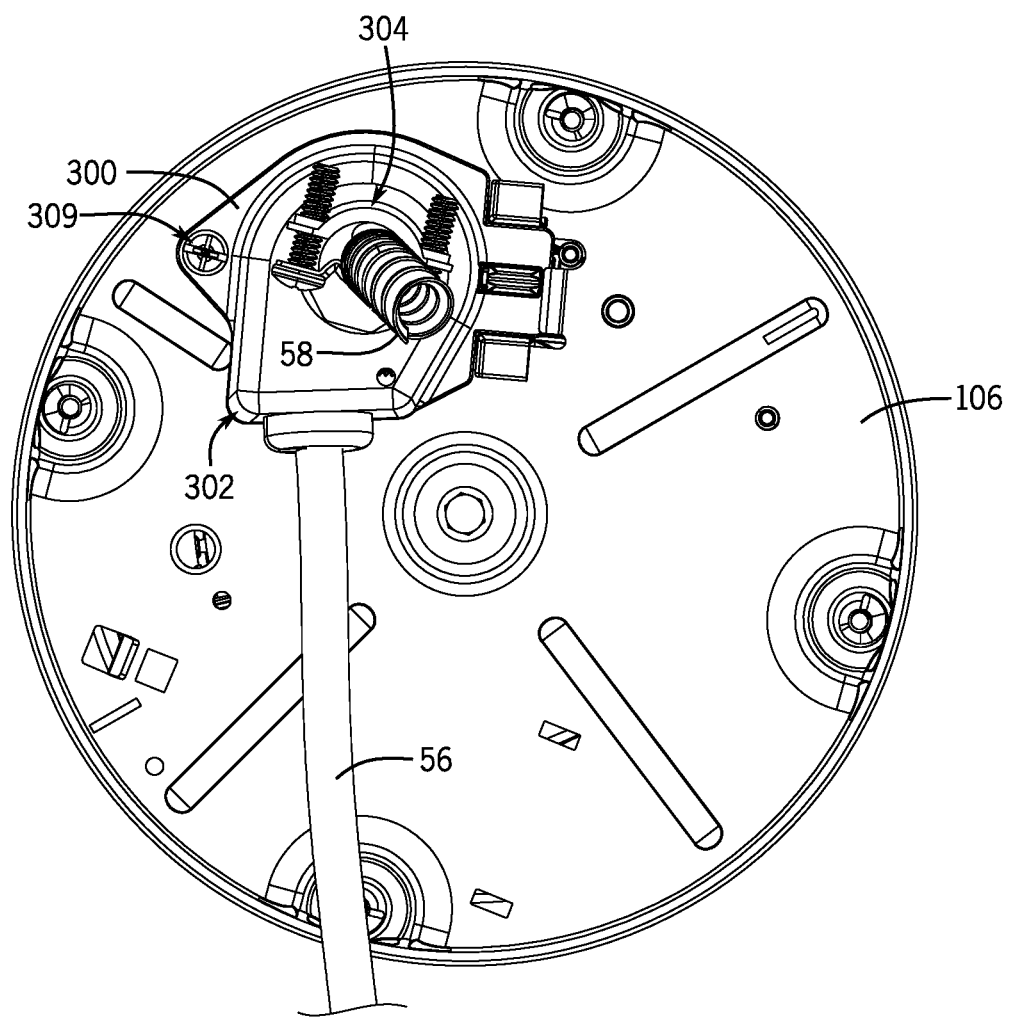
FIG. 3 is a bottom perspective view of the first example food waste disposer assembly and Romex/BX cable of FIGS. 1 and 2, with each of a cover control switch cord of the assembly and the Romex/BX cable shown in cutaway.
Figure 4:
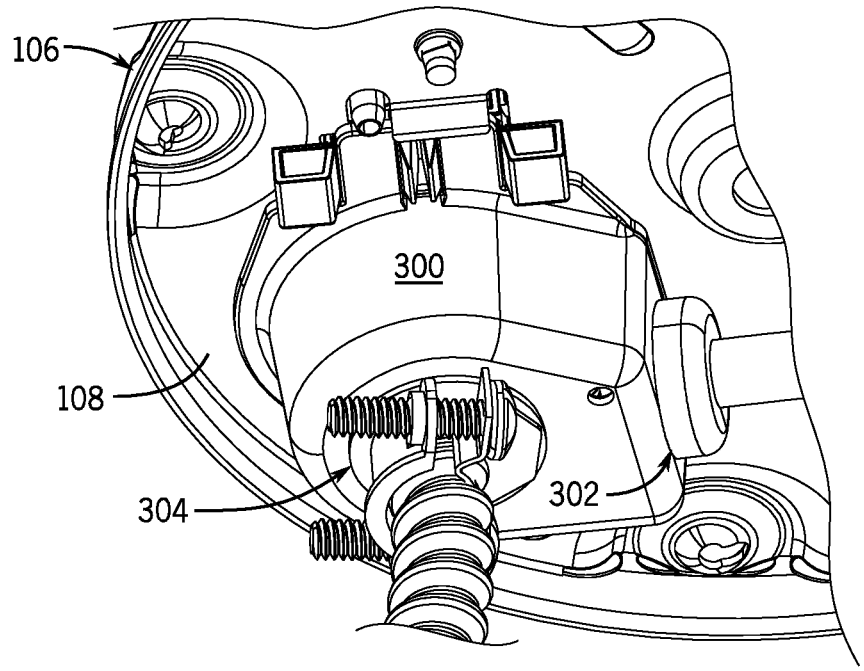
FIG. 4 is a first cutaway, enlarged bottom perspective view of portions of the first example food waste disposer assembly of FIGS. 1, 2, and 3.
Figure 5:
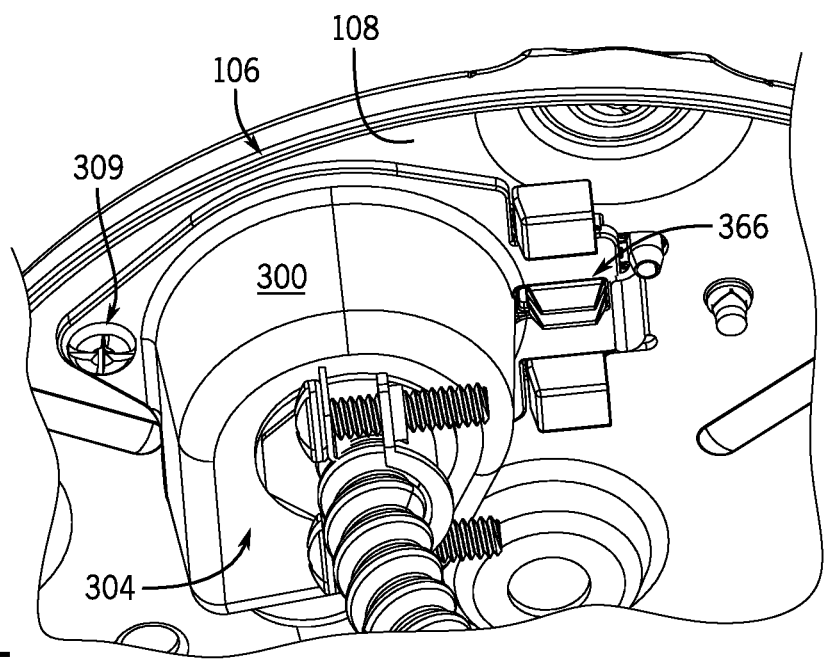
FIG. 5 is a second cutaway, enlarged bottom perspective view of portions of the first example food waste disposer assembly of FIGS. 1, 2, 3, and 4.

Turning to FIG. 3, FIG. 4, and FIG. 5, first, second, and third bottom perspective views are provided of the food waste disposer assembly 10 or portions thereof, to more fully illustrate how a terminal cover (or junction box) 300 of the LEF connecting components 54 receives the cover control switch cord 56 as well as the Romex/BX cable 58. More particularly, FIG. 3 is a bottom perspective view of the food waste disposer assembly 10 of FIGS. 1 and 2, with each of the cover control switch cord 56 and the Romex/BX cable 58 shown in cutaway. By comparison, FIG. 4 is a first cutaway, enlarged bottom perspective view of portions of the food waste disposer assembly 10, and FIG. 5 is a second cutaway, enlarged bottom perspective view of portions of the food waste disposer assembly 10. FIGS. 3, 4, and 5 particularly show that the terminal cover 300 of the LEF connecting components 54 is coupled along a bottom surface 108 of the LEF 106 and is configured so that the cover control switch cord 56 enters the terminal cover at a first side wall 302 but the Romex/BX cable 58 enters the terminal cover at a bottom wall 304. The bottom wall 304 is substantially parallel to the bottom surface 108 of the LEF 106, and so the Romex/BX cable 58 enters the terminal cover 300 in a direction that is substantially normal (or perpendicular) to the bottom surface 108 of the LEF. By comparison, the cover control switch cord 56 enters the terminal cover 300 in a direction that is substantially parallel to or along the bottom surface 108 of the LEF 106.

Figure 6:
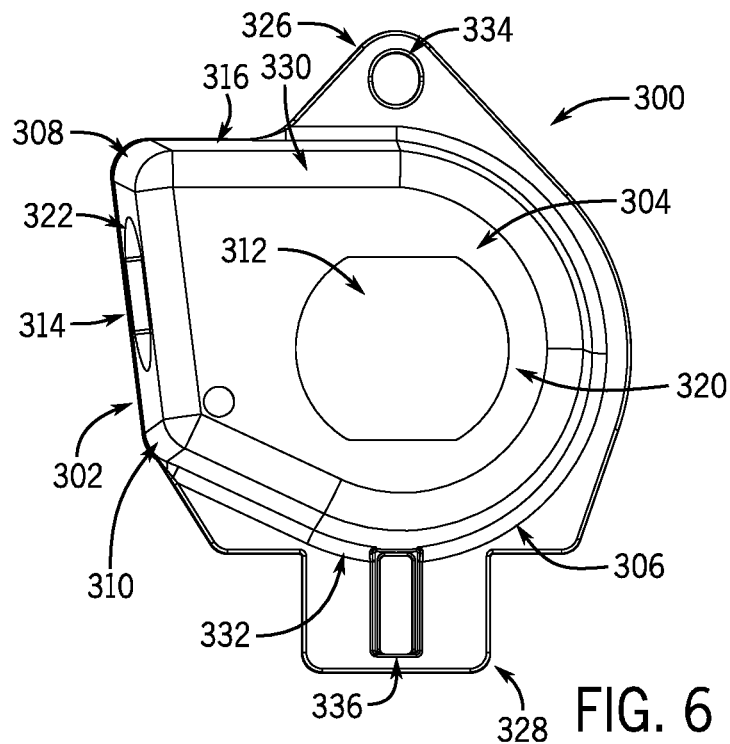
FIG. 6 is a bottom plan view of a terminal cover of the first example food waste disposer assembly of FIGS. 1, 2, 3, 4, and 5.
Figure 7:
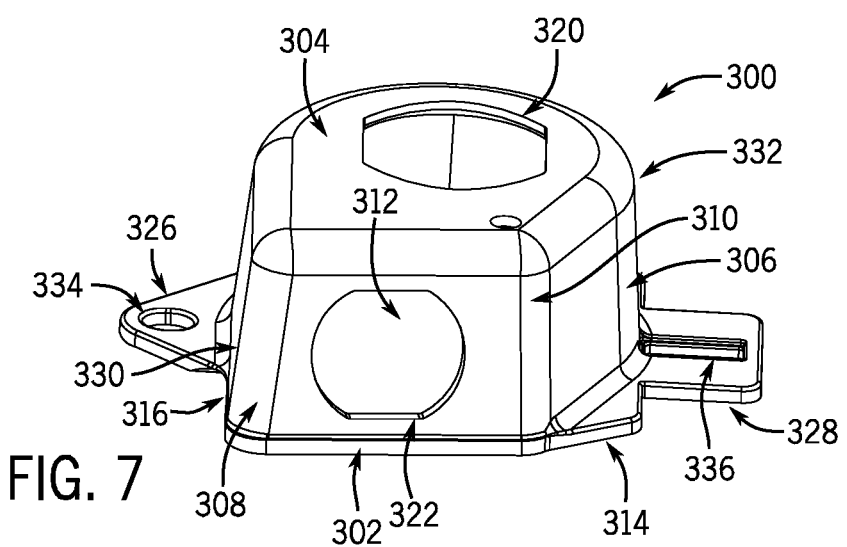
FIG. 7 is a bottom perspective view of the terminal cover of FIG. 6.

More particularly with respect to the terminal cover 300, FIG. 6 provides a bottom plan view of the terminal cover and FIG. 7 provides a bottom perspective view of the terminal cover. As shown, the terminal cover (or junction box) 300 takes the form of a cup that includes, in addition to the bottom wall 304, the first side wall 302 that extends upward from the bottom wall (downward when viewed as shown in FIG. 7) to a first rim portion 314, and an additional curved side wall 306 that also extends upward from the bottom wall to a second rim portion 316. The bottom wall 304 includes a bottom orifice 320 that is configured to receive the Romex/BX cable 58 and the first side wall 302 includes a side orifice 322 that is configured to receive the cover control switch cord 56. The additional curved side wall 306 extends around the bottom wall 304 from a first upwardly-extending edge 308 of the first side wall 302 to a second upwardly-extending edge 310 of the first side wall, such that the bottom wall 304, first side wall 302, and additional curved side wall 306 together define the cup in terms of defining an interior space 312 (see also FIG. 8). The interior space 312 is entirely enclosed except for the bottom orifice 320, the side orifice 322, and a top opening 324 defined by the first rim portion 314 and the second rim portion 316.

In addition, the terminal cover 300 includes a first rim extension (or lip) 326 and a second rim extension (or lip) 328, each of which extends outward from the second rim portion 316 parallel or substantially parallel to the bottom wall 304 and can be considered to form a part of second rim portion. More particularly, the first rim extension 326 is a substantially triangular formation that extends generally outward away from a first side portion 330 of the additional curved side wall 306 that is adjacent to the first upwardly-extending edge 308. Also, the second rim extension 328 is a substantially rectangular formation that extends generally outward away from a second side portion 332 of the additional curved side wall 306 that is adjacent to the second upwardly-extending edge 310. The first rim extension 326 includes a round orifice 334 therein and the second rim extension 328 includes an elongated slot 336 that also extends generally outward away from the second side portion 332.

In the present embodiment, the terminal cover 300 is made as a zinc casting. The use of a zinc casting can be desirable in terms of making it easier to achieve the complex shape of the terminal cover 300 that is suitable for the desired manner of wire routing. In other embodiments, the terminal cover 300 can be made from other materials such as steel, or in other manners.

Figure 8:
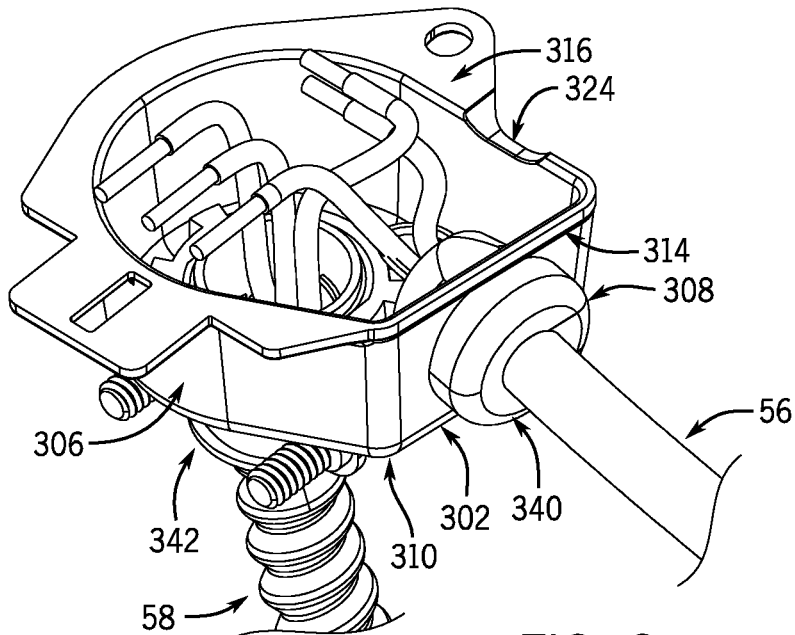
FIG. 8 is a top perspective view of several LEF connecting components, including the terminal cover of FIGS. 6 and 7, of the food waste disposer assembly of FIGS. 1 and 2, assembled in combination with a cover control switch cord (shown in cutaway) of the food waste disposer assembly and the Romex/BX cable (shown in cutaway) of FIGS. 1 and 2.
Figure 9:
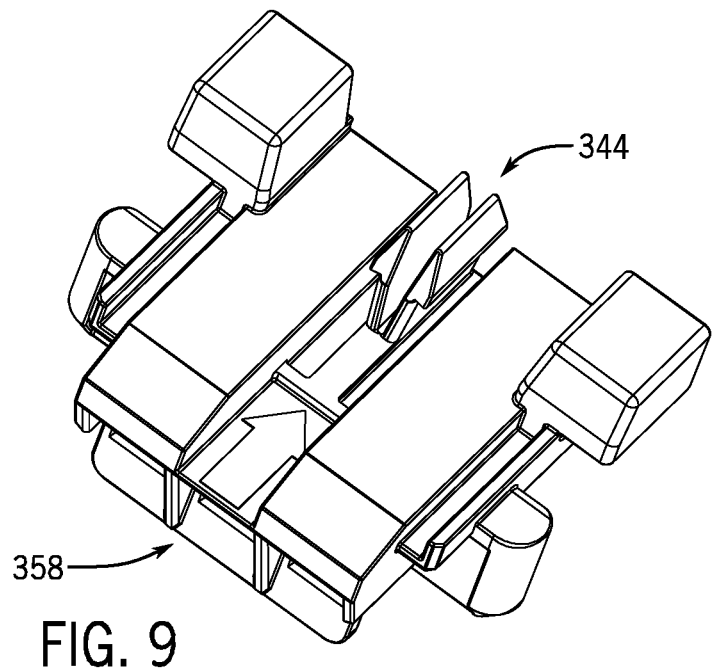
FIG. 9 is a perspective view of a start switch interface connector of the food waste disposer assembly of FIGS. 1 and 2.

Turning to FIG. 8, the LEF connecting components 54 in the present embodiment include not only the terminal cover 300 but also a strain relief component (or grommet) 340, an additional strain relief component (or simply strain relief) 342, and a start switch interface connector 344 (see FIG. 9). Also, as will be described further below, the LEF connecting components 54 in the present embodiment additionally include a wire joiner or wire joiner connector 346 (see FIG. 13), although in another embodiment a wire nut 348 is employed in place of the wire joiner connector. The cover control switch cord 56 can be affixed to the terminal cover 300 by way of the strain relief component 340, and the Romex/BX cable 58 can be secured in relation to the terminal cover 300 by way of the strain relief 342. The strain relief 342 (which can also be referred to as a power link coupler, or a Romex/BX coupler) in the present embodiment can take the form of a commonly available electrical component typically used to ground metallic sheathed cable (BX) and/or secure the Romex/BX cable to another component such as, for example, an electrical outlet box or an adapter (in alternate embodiments, the strain relief can take other forms, such as a grommet).

Further, the LEF connecting components 54 are configured to facilitate the coupling of first and second wire leads 350 and 352, respectively, of the cover control switch cord 56, and third, fourth, and fifth wire leads 354, 356, and 357, respectively (the white/neutral, green/ground, and black/live leads, respectively), of the Romex/BX cable 58, with one another and with the start switch interface connector 344 as described in further detail below with respect to FIGS. 9 through 20. Additionally, the start switch interface connector 344 is configured to be coupled to a start switch 388 (see FIG. 16) of the food waste disposer 100 as also described in further detail below.

Turning to FIGS. 9-20, additional perspective views are shown of the food waste disposer assembly 10 and portions thereof, particularly to illustrate a method of assembly or installation of the food waste disposer assembly in relation to the Romex/BX cable 58, in accordance with an example embodiment encompassed herein. The method can be performed by any of a variety of operators or users, such as a customer who purchased the food waste disposer 100, or a professional technician or installer. In particular, the method represented by FIGS. 9-20 in the present embodiment is one in which the control switch mechanism 50, as can be provided in the form of a cover control kit (or as can be provided along with the food waste disposer 100 when purchase), is assembled in relation to the food waste disposer 100. Also, in the method represented by FIGS. 9-20, the Romex/BX cable 58 is coupled to the control switch mechanism 50 and to the food waste disposer 100. By way of the method, the food waste disposer assembly 10 is coupled to a power source by way of the Romex/BX cable 58 and also is configured to allow operator control of the food waste disposer by the control switch mechanism 50. Although the method as shown by FIGS. 9-20 entails coupling of the food waste disposer assembly 10 to a power source by way of the Romex/BX cable 58, the present disclosure also encompasses additional methods that entail coupling the food waste disposer assembly to a power source by way of a power cord, as discussed further below.

In the present embodiment, the method of FIGS. 9-20 begins at a first step represented by FIG. 9, which shows a perspective view of the start switch interface connector 344. In the first step represented by FIG. 9, an operator strips (e.g., by way of a wire stripping tool) each of the third and fourth wire leads 354 and 356 (e.g., white and green wires) of the Romex/BX cable 58 and the first wire lead 350 (or alternatively the second wire lead 352) of the cover control switch cord 56. In the present embodiment, each of these wire leads 354, 356, and 350 (or 352) is stripped to a push in terminal distance. As illustrated in FIG. 9, the start switch interface connector 344 includes a wire stripping feature 358 that shows the extent to which each of the third, fourth, and first wire leads 354, 356, and 350 (or the second lead 352) should be stripped.

Figure 10:
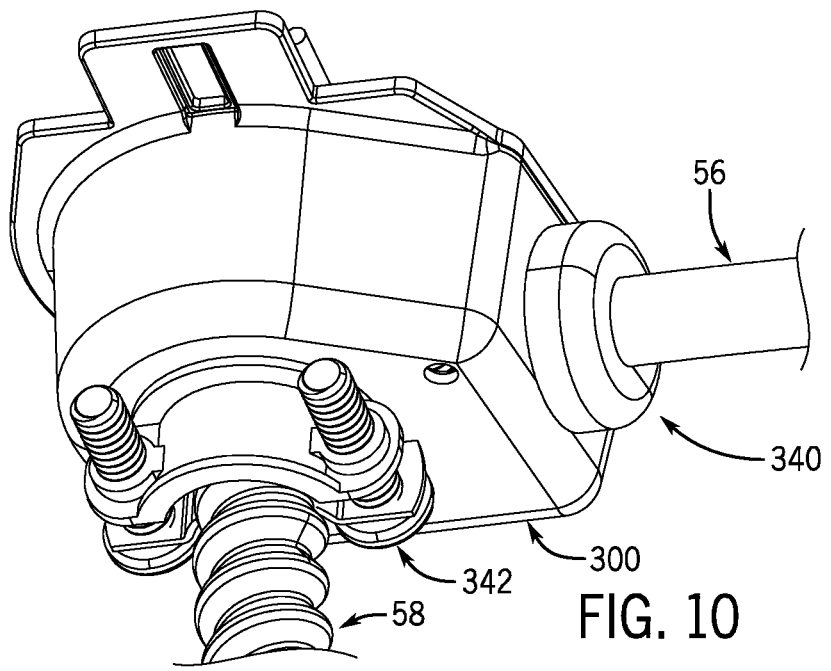
FIGS. 10, 11, 12, 13, 14, 15, 16, 19, and 20 respectively are perspective cutaway views of portions of the food waste disposer assembly of FIGS. 1 through 8 that, together with FIGS. 9, 17, and 18, are intended to illustrate, collectively, steps of a method of assembly or installation of the food waste disposer assembly of FIGS. 1 and 2.

Next, at a second step represented by FIG. 10, the operator inserts and secures, relative to the terminal cover 300, each of the cover control switch cord 56 and the Romex/BX cable 58. More particularly, in this second step, the operator inserts the strain relief component (or grommet) 340 into the side orifice 322 of the terminal cover 300 and additionally inserts the cover control switch cord 56 (the end opposite the end coupled to the primary body 52) including the first and second wire leads 350 and 352 through the side orifice 322 and through the strain relief component therewithin, from the exterior of the terminal cover 300 into the interior space 312 of the terminal cover. Additionally, the operator inserts the strain relief 342 into (or in relation to) the bottom orifice 320 of the terminal cover 300 and additionally inserts the Romex/BX cable 58 (the free end opposite the end coupled to any power source) including the third, fourth, and fifth wire leads 354, 356, and 357 through the bottom orifice 320 and through the strain relief (or grommet) 342, from the exterior of the terminal cover 300 into the interior space 312 of the terminal cover. Upon completion of this second step, each of the cover control switch cord 56 and the Romex/BX cable 58 are coupled to and secured relative to the terminal cover 300, in a manner such that each of the first, second, third, fourth, and fifth wire leads 350, 352, 354, 356 and 357 are positioned in the interior space 312, as shown in FIG. 8.

Figure 11:
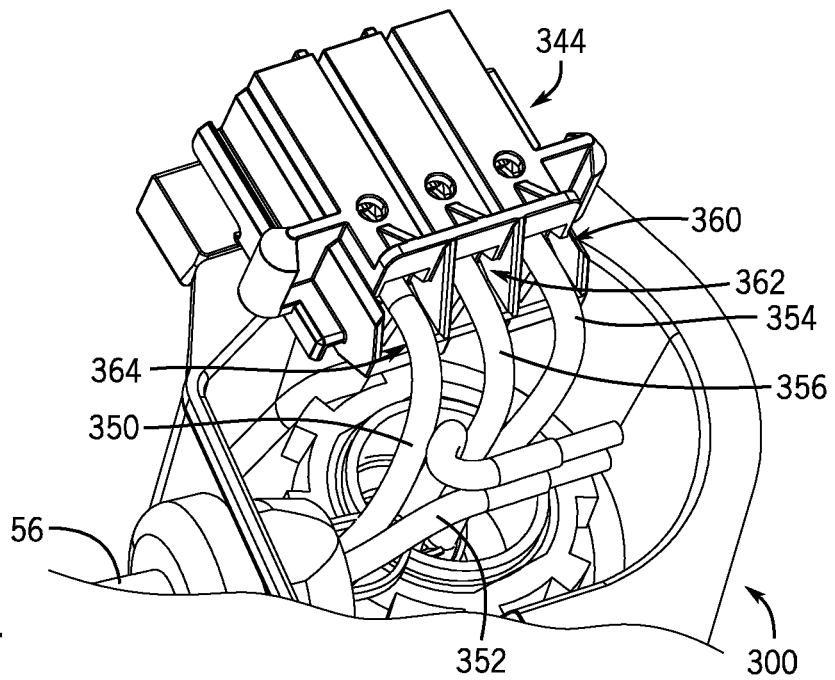
Figure 12:
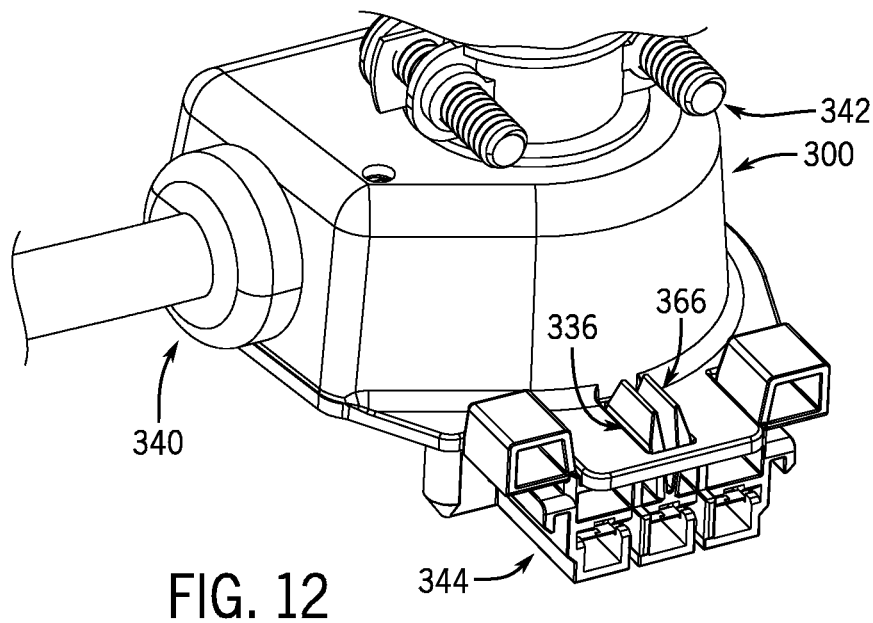

Next, at a third step represented by FIG. 11, the operator assembles/couples the start switch interface connector 344 with respect to each of the cover control switch cord 56 and the Romex/BX cable 58. To achieve this coupling, the operator pushes in the third and fourth wire leads 354 and 356 of the Romex/BX cable 58 (which were stripped in the first step) into first and second input ports 360 and 362, respectively, of the start switch interface connector 344. Additionally, the operator pushes the first wire lead 350 (or alternatively the second wire lead 352, depending upon whether the first or second wire lead was stripped in the first step) into a third input port 364 of the start switch interface connector 344. Further, at a fourth step represented by FIG. 12, the operator snaps the start switch interface connector 344 into the terminal cover 300 so as to be secured relative to the terminal cover. This snapping of the start switch interface connector 344 in relation to the terminal cover 300 in the present embodiment is achieved by positioning pronged deformable snapping features 366 of the start switch interface connector (see also FIG. 9) into and at least partly through the elongated slot 336 until the snapping features snap into place behind the elongated slot as shown in FIG. 12. FIG. 12 particularly illustrates the combination of the start switch interface connector 344 and the terminal cover 300 when assembled in this manner, and with the snapping features 366 jutting out of the elongated slot 336 after having been pushed therethrough.

Figure 13:
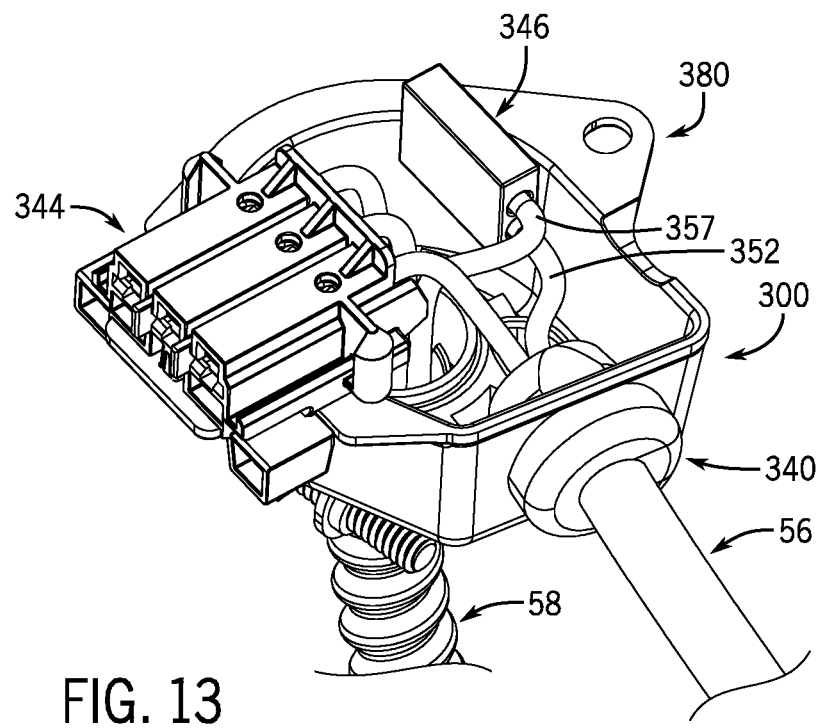

Next, at a fifth step shown in FIG. 13, the operator couples the second wire lead 352 of the cover control switch cord 56 to the fifth (e.g., black) wire lead 357 of the Romex/BX cable 58, by way of the wire joiner connector 346. Upon joining the second and fifth wire leads 352 and 357, an overall terminal assembly 380 including the terminal cover 300, the start switch interface connector 344, the strain relief component 340, the power link coupler 342, and the wire leads 350, 352, 354, 356, and 357 and associated ends of the cover control switch cord 56 and the Romex/BX cable 58, is ready to be installed or coupled in relation to the food waste disposer 100 and particularly the LEF 106. For purposes of the present description, it will be appreciated that the terminal assembly 380 both includes components that are considered parts of the food waste disposer assembly 10, such as the LEF connecting components 54 including the terminal cover 300, and also includes components that are (at least as described above) not considered to be part of the food waste disposer assembly 10, namely, the third, fourth, and fifth wire leads 354, 356, and 357 of the Romex/BX cable 58. Nevertheless, in other contexts, the terminal assembly can be understood to include all of the components of the terminal assembly 380 except for any portions of the Romex/BX cable 58 such as the wire leads 354, 356, and 357.

Figure 14:
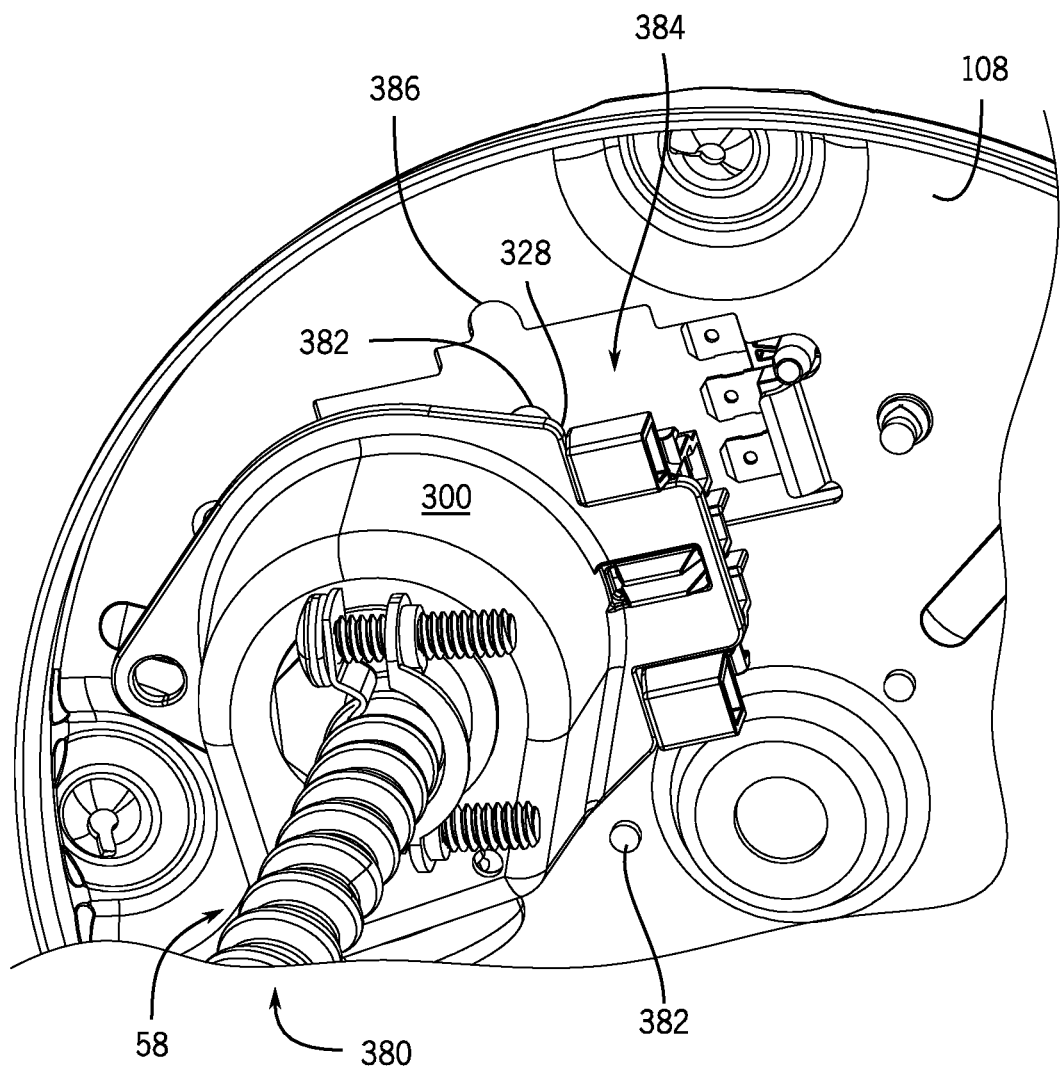
Figure 15:
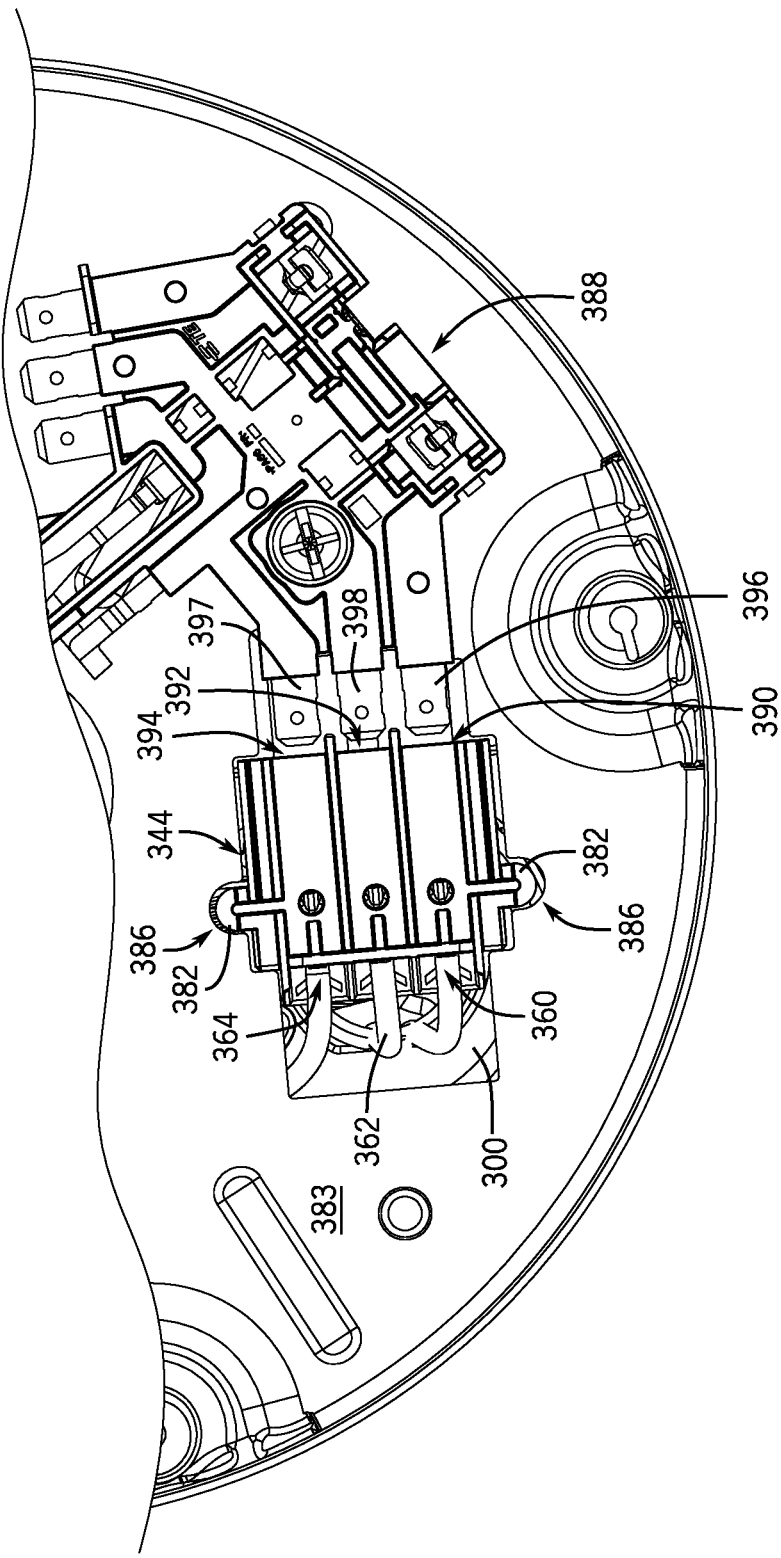

Installation/assembly of the terminal assembly 380 in relation to the LEF 106 generally involves three steps. At a sixth step represented by FIGS. 14 and 15, the terminal assembly 380 is aligned and fitted into the LEF 106. More particularly in this regard, FIG. 14 provides a bottom perspective view of portions of the LEF 106 in relation to the terminal assembly 380, as the terminal assembly is approaching the bottom surface 108 of the LEF 106. As illustrated, the start switch interface connector 344 includes first and second keying tabs (or protrusions) 382 arranged on opposite sides of that start switch interface connector, generally above opposite sides of the second rim extension 328. The LEF 106 includes a generally-rectangular LEF opening (or orifice) 384 that includes first and second keying recesses 386 (see also FIG. 15) that respectively are complementary in shape to the first and second keying tabs 382, such that the start switch interface connector is keyed to the LEF opening. The LEF opening 384 including the keying recesses 386 is shaped and sized so that, as the terminal assembly 380 reaches the bottom surface 108 of the LEF 106, the start switch interface connector 344 is able to proceed into the food waste disposer 100 and be positioned above an inner (top or inwardly-facing) surface 383 of the LEF, as shown in FIG. 15, which provides a top plan view of portions of that inner surface and the terminal assembly 380. Although the start switch interface connector 344 is positioned above the inner surface 383 of the LEF 106 when the terminal assembly 380 is aligned and fitted into the LEF 106, it should further be appreciated from FIGS. 14 and 15 that the terminal cover 300 remains positioned entirely below the bottom surface 108 of the LEF 106, with the first and second rim extensions 326 and 328 being positioned so as to abut and interface that bottom surface.

Figure 16:
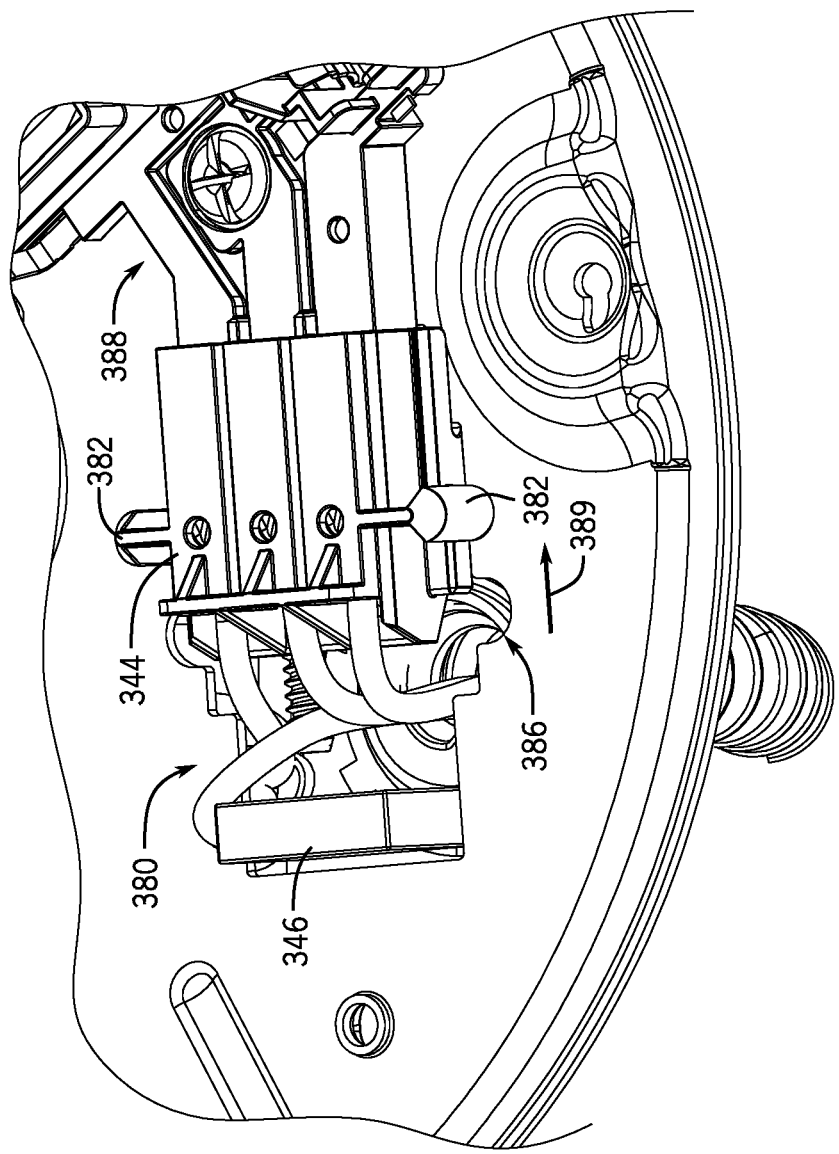

Additionally, subsequent to the sixth step, at a seventh step represented by FIG. 16 the terminal assembly 380 is slid relative to the LEF 106 so that the start switch interface connector 344 is pushed ahead tight against a start switch 388 that is mounted and supported upon the inner surface 383 of the LEF 106. It will be appreciated also from FIG. 15 that the start switch interface connector 344 includes first, second, and third output ports 390, 392, and 394, respectively, that are opposed to (and coupled electrically to) the first, second, and third input ports 360, 362, and 364, respectively, and additionally that the start switch 388 includes first, second, and third input tabs 396, 398, and 397, respectively. Further there is a gap (not shown) at least between certain portions of the start switch interface connector 344 such as the keying tabs 382 and certain portions of the terminal cover 300 such as the first and second rim extensions 326 and 328. Given this arrangement, it is possible for a user/installer to cause the terminal assembly 380, and particularly the start switch interface connector 344, to slide in a direction indicated by an arrow 389 shown in FIG. 16 relative to the LEF 106 until (as shown in FIG. 16) the respective first, second, and third input tabs 396, 398, and 397 are positioned within, and electrically coupled to, the respective first, second, and third output ports 390, 392, and 394, respectively.

Figure 17:
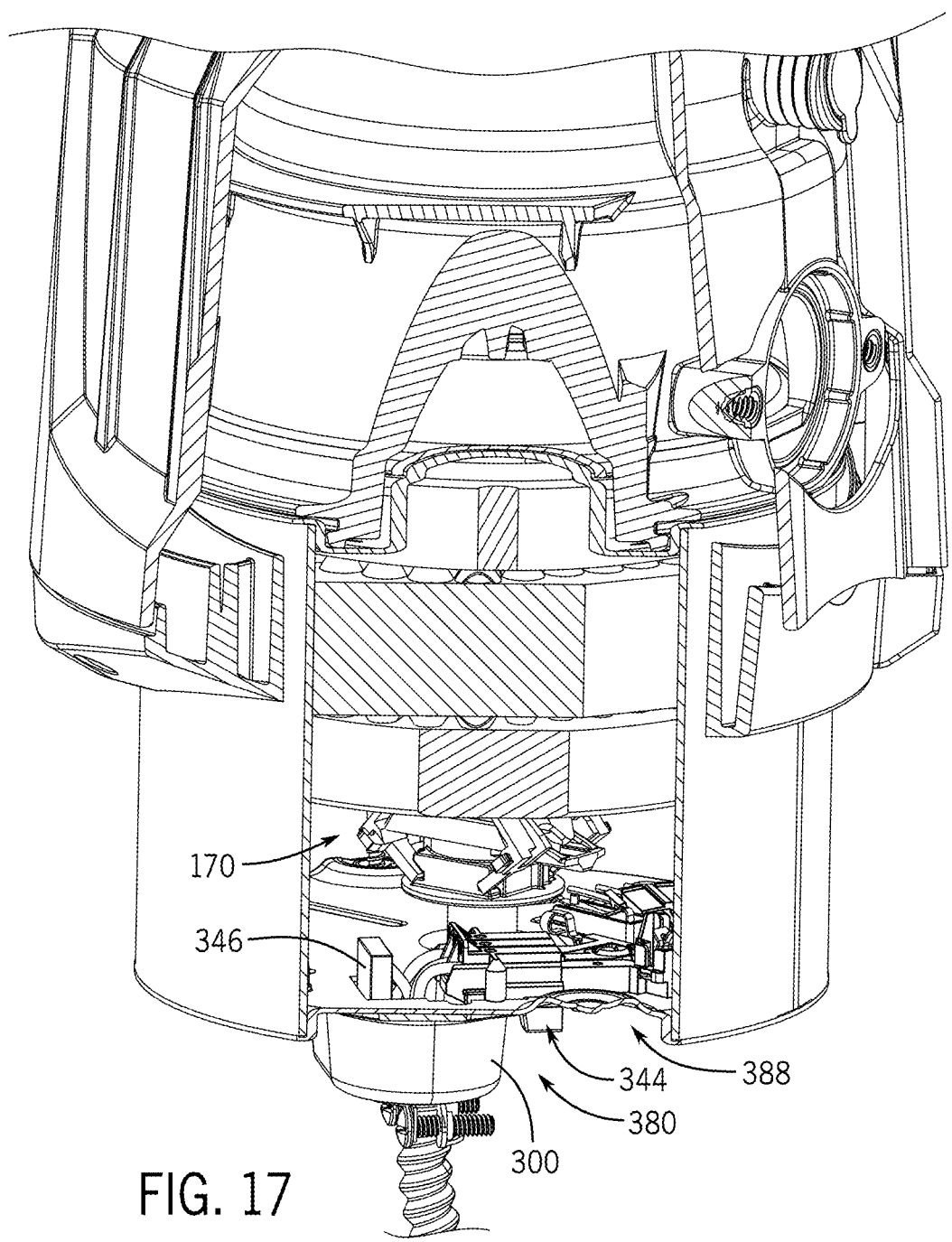
FIGS. 17 and 18 provide two additional cutaway views of the food waste disposer assembly of FIGS. 1 and 2 that further illustrate portions of that assembly after a step of the method of assembly/installation represented by FIG. 16 has been completed.
Figure 18:
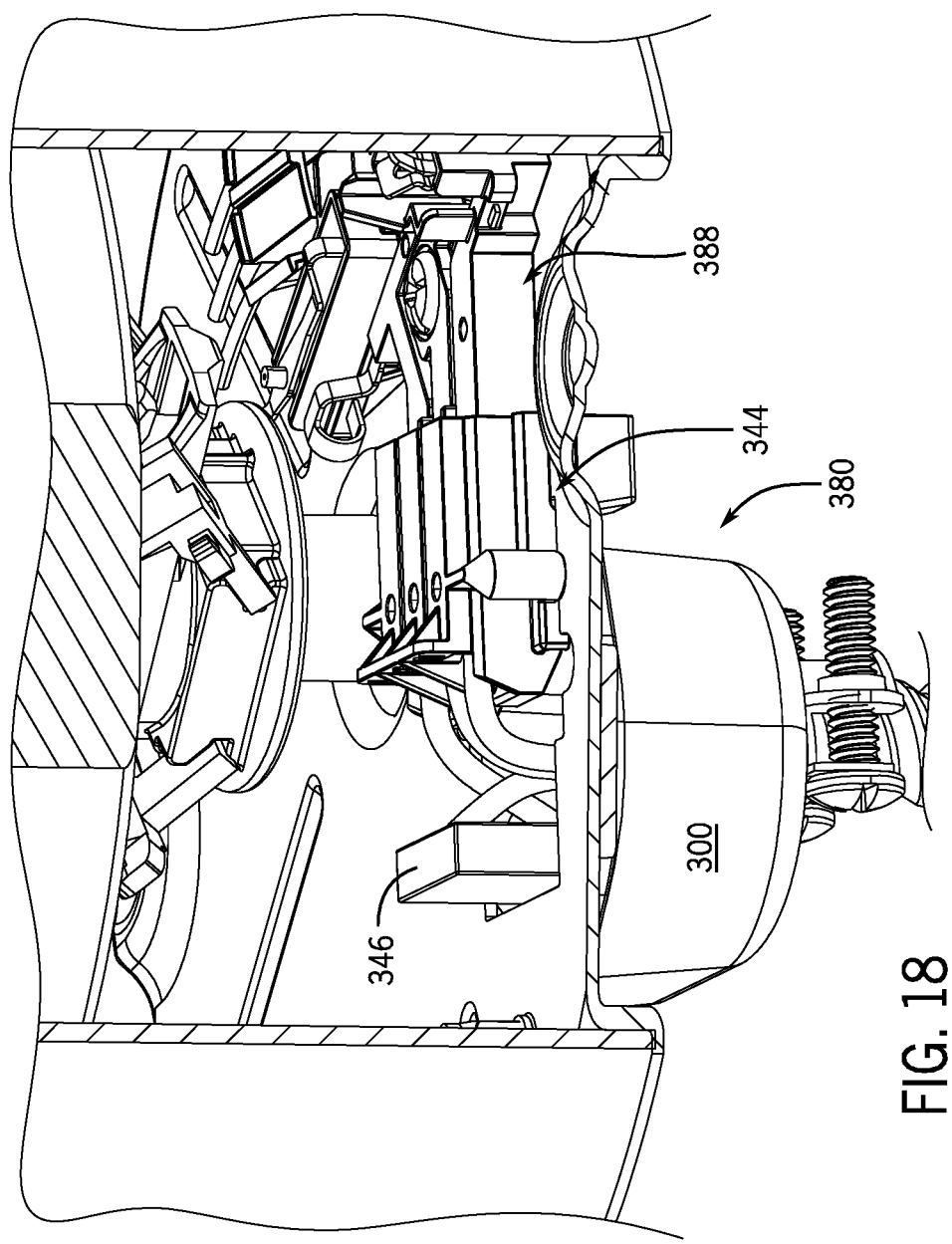

Given such installation, it will be appreciated that the first, second, and third input tabs 396, 398, and 397 of the start switch 388 are electrically coupled to the third, fourth, and first wire leads 354, 356, and 350, respectively. FIGS. 17 and 18 respectively show first and second side perspective, cutaway views of the food waste disposer 100 and terminal assembly 380 when the terminal assembly has been slid relative to the LEF 106 so that the start switch interface connector 344 is coupled to the start switch 388. Further, when such installation has been completed, it should be recognized that a switchable electrical circuit is completed among each of the Romex/BX cable 58, the control switch mechanism 50, and the start switch 388 (and associated motor of the food waste disposer). In particular, this electrical circuit can be understood to extend from the fifth wire lead (e.g., the black, live power lead) 357 of the Romex/BX cable 58 to the second wire lead 352 of cover control switch cord 56 coupled thereto by way of the wire joiner connector 346. Further, this electrical circuit can be understood to extend additionally through the control switch mechanism 50, from the second wire lead 352 via the cover control switch cord 56 to actuation switch(es) 53 within the primary body 52, and back to the first wire lead 350 via the cover control switch cord. Additionally, this electrical circuit can be understood to extend further to the motor 170 via the start switch 388 and the start switch interface connector 344, insofar as the first wire lead 350 is coupled to the start switch interface connector that is in turn connected to the motor via the switch module (depending upon switching status of the switch module). Further, the electrical circuit is completed, at least in terms of the circuit being coupled back to the Romex/BX cable 58, insofar as the motor 170 is coupled to one or both of the third wire lead 354 and the fourth wire lead 356 of the Romex/BX cable again by way of the start switch 388 and start switch interface connector 344.

Figure 19:
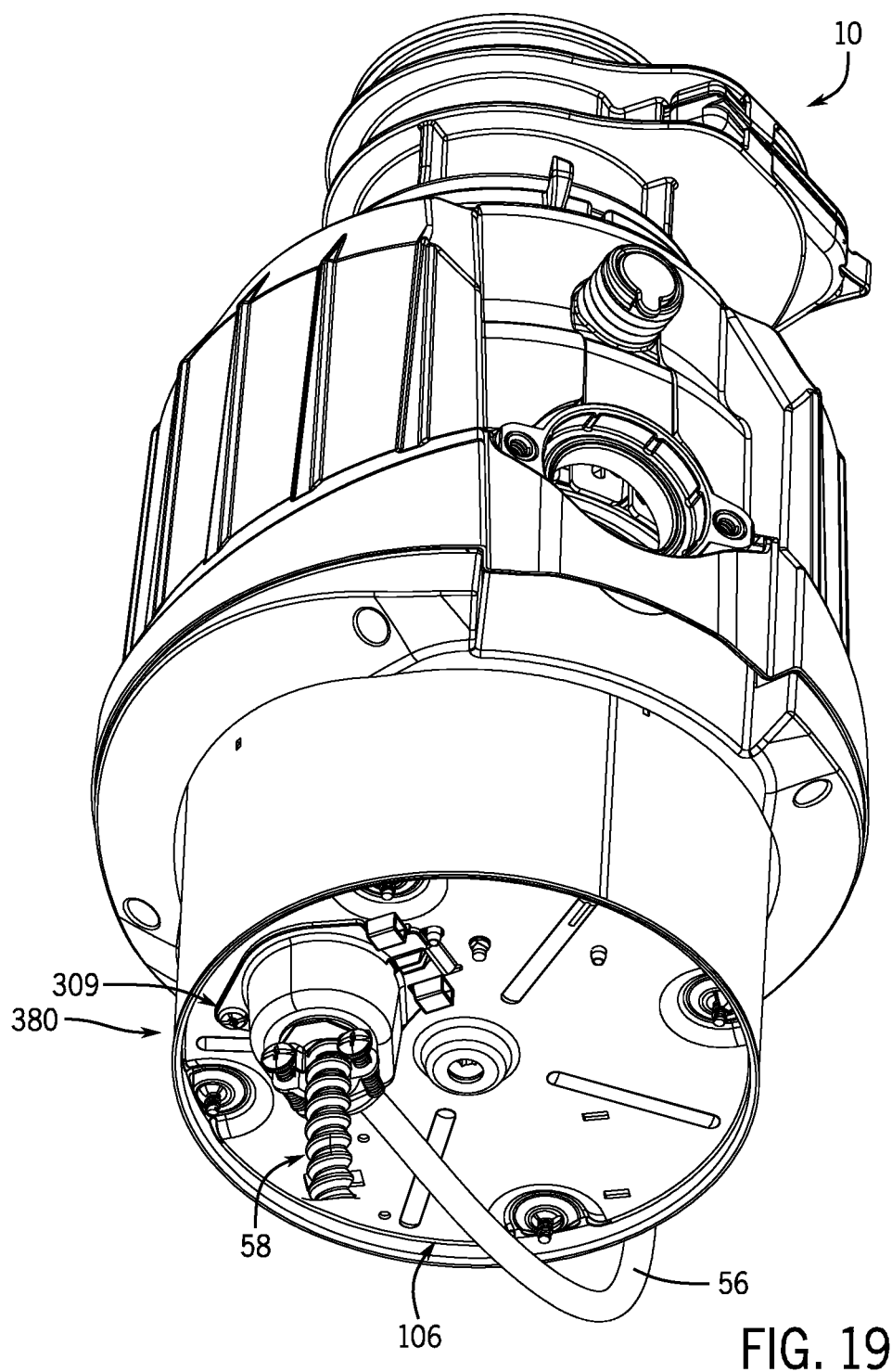

Upon completion of the seventh step, an eighth step in the installation process is performed in which the terminal assembly 380 is secured to the food waste disposer 100 and particularly to the LEF 106, as shown in FIG. 19. In the present example embodiment, the terminal assembly 380 is secured to the food waste disposer 100 by way of screwing-in a fixing screw 309 through the round orifice 334 in the terminal cover 300 and then subsequently into a receiving orifice (not shown) that is provided in the LEF 106, when the terminal assembly 380 has been slid into position (so that the start switch interface connector 344 is engaged with the start switch 388) as described in regard to FIGS. 16, 17, and 18). By screwing-in the fixing screw 309, the terminal assembly 380 is locked into position relative to the LEF 106. In particular, when locked in this position, the terminal assembly 380 cannot slide away from and disengage from the start switch 388. Further, when locked in this position, the keying tabs 382 are not aligned with the keying recesses 386, and thus the terminal assembly 380 is retained against the LEF 106 insofar as the start switch interface connector 344 is in contact with the inner surface 383 and cannot pass through the LEF 106 out of the food waste disposer 100. That is, by virtue of the keying tabs (or LEF tabs) 382 being positioned along the inner surface 383 of the LEF 106 at locations where there are none of the keying recesses 386, the terminal assembly 380 (and particularly the front of the terminal assembly, that is, the portion closest to the start switch 388) also is secured relative to the LEF.

It should be appreciated that, depending upon the embodiment, the fixing screw 309 can be considered a part of the food waste disposer 100 (and/or the LEF 106 thereof) or alternatively can be considered one of the LEF connecting components 54 (and/or part of the terminal assembly 380). In embodiments in which the fixing screw 309 is included as part of the food waste disposer 100 (e.g., as originally purchased), the above-described method should be understood to include a preliminary step of removing the fixing screw 309 from the LEF 106 prior to the installation of the terminal assembly 380 with respect to the LEF 106 (e.g., prior to the sixth step of FIGS. 14 and 15 as described above). Alternatively, if the fixing screw 309 is considered to be one of the LEF connecting components 54, then no preliminary step of removing the fixing screw from the LEF needs to be performed.

Figure 20:
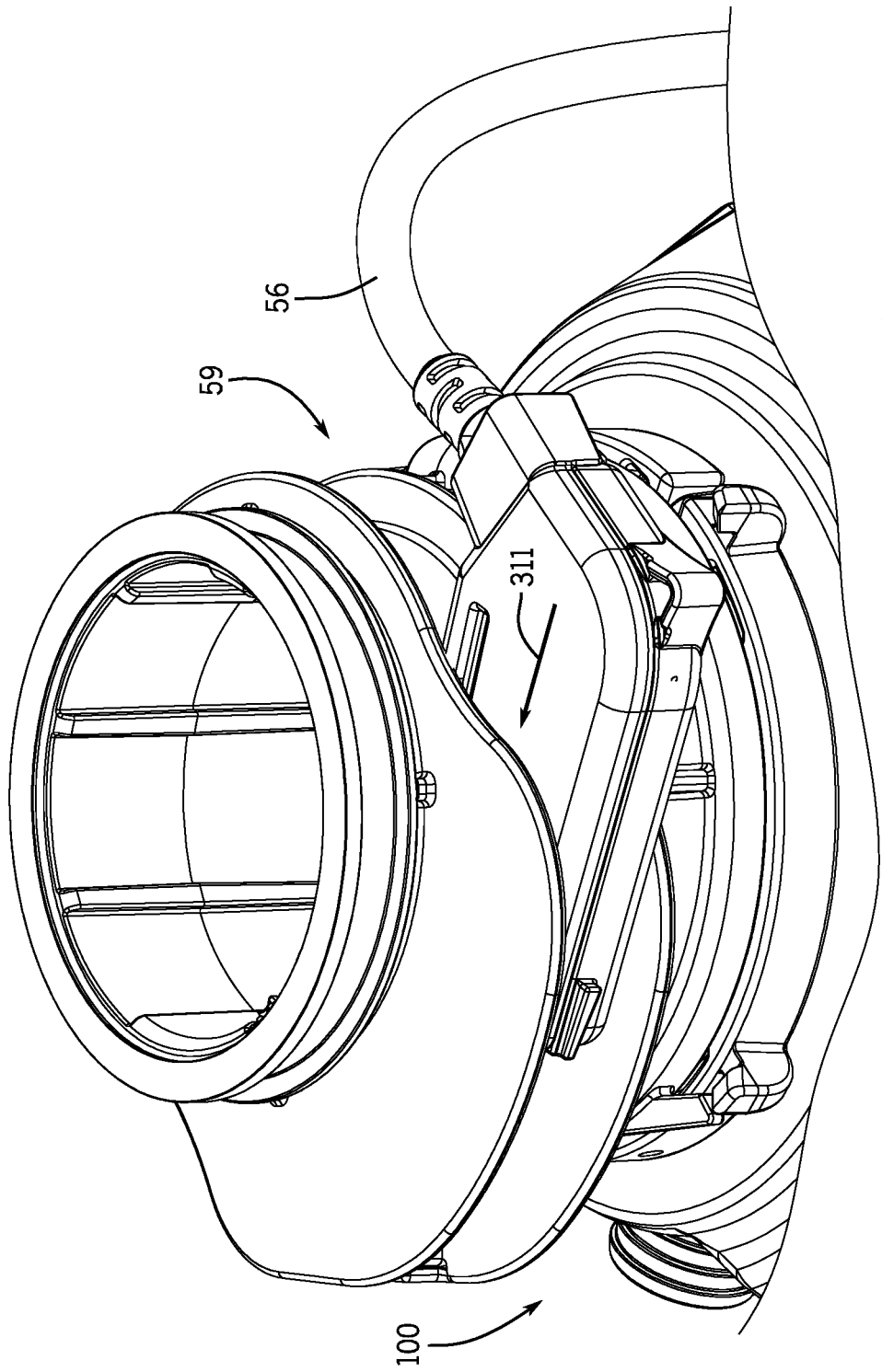

Finally, after the terminal assembly 380 is secured to the LEF 106 by way of installation of the fixing screw 309, a ninth step is performed as illustrated by FIG. 20. In this ninth step, the primary body 52 of the control switch mechanism 50 (e.g., the cover control switch) is attached in place with respect to the AV extension tube 59 at the top of the food waste disposer 100. In the present embodiment, the primary body 52 can be snapped in place by moving the primary body 52 relative to the AV extension tube 59 in a direction as indicated by an arrow 311.

Figure 21:
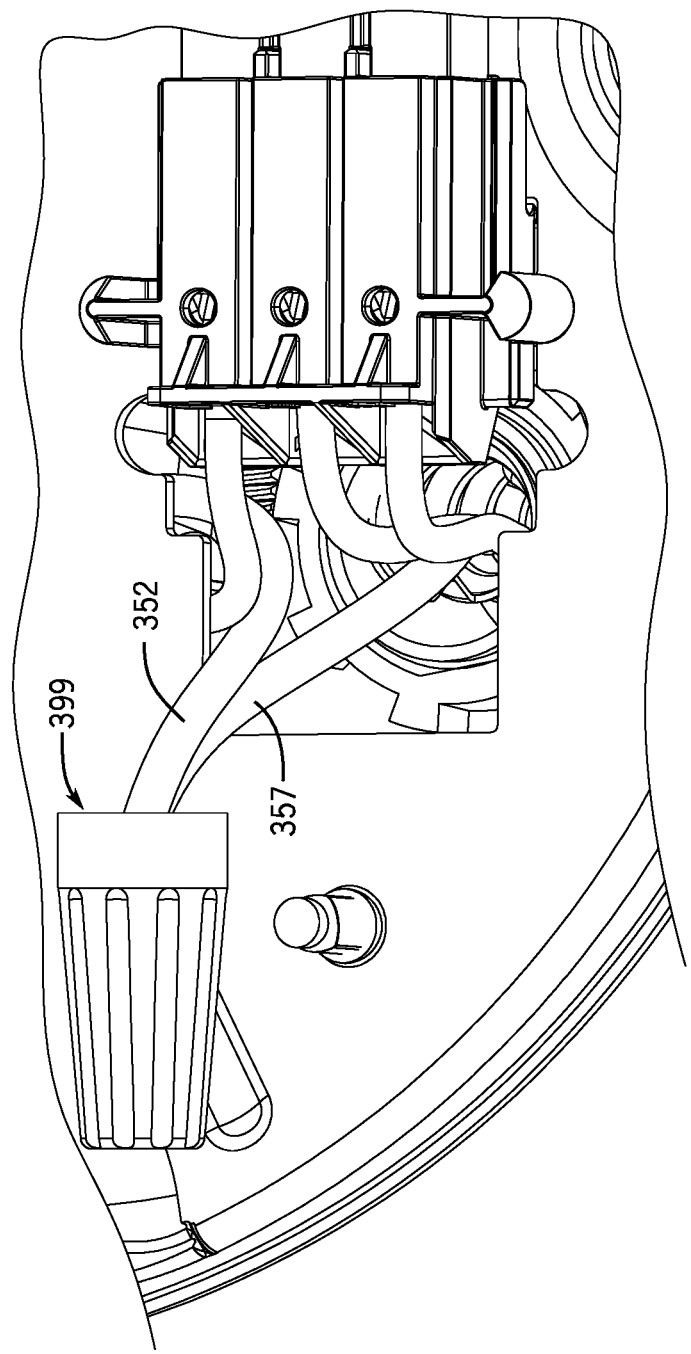
FIG. 21 is a perspective view of an alternate embodiment of a terminal assembly in which a wire nut is employed to couple wire leads in place of a wire joiner connector.

The present disclosure is intended to encompass numerous other embodiments and arrangements in addition to those described above with respect to FIGS. 1-20. For example, although the above-described embodiment envisions that the LEF connecting components 54 include the wire joiner connector 346, in an alternate embodiment the LEF connecting components can instead include a wire nut 399. For such an embodiment employing a wire nut, the fifth step (previously described with respect to FIG. 13) can take an alternative form in which the operator couples the second wire lead 352 of the cover control switch cord 56 to the fifth (e.g., black) wire lead 357 of the Romex/BX cable 58 by way of the wire nut 399, as shown in FIG. 21.

Additionally, as already noted above, the present disclosure relates to food waste disposer assemblies in which the food waste disposers, and additionally the cover control mechanisms, can be coupled to receive electric power by a power cord that can be plugged into a wall outlet or other power source, rather than coupled to receive electric power by way of the Romex/BX cable 58. More particularly, although FIGS. 1 through 21 envision the food waste disposer assembly 10 as having the LEF connecting components 54 coupled to the Romex/BX cable 58, the present disclosure also envisions embodiments of food waste disposer assemblies in which the LEF connecting components 54 are coupled to the power cord 400 (see FIG. 22) that plugs into a wall outlet (not shown).

Further, it should be appreciated that the process described above with reference to FIGS. 9 through 20 can be performed not only to assemble the food waste disposer assembly 10 in relation to the Romex/BX cable 58, but also to assemble the food waste disposer assembly in relation to the power cord 400. That is, the process is identical except insofar as the steps involving coupling of the Romex/BX cable 58 in relation to the LEF connecting components 54 are modified to be steps involving coupling of the power cord 400 in relation to those LEF connecting components. In this regard, it should be appreciated that, in the modified version of the first step represented by FIG. 9, an operator strips (e.g., by way of a wire stripping tool) each of the third and fourth wire leads of the power cord 400 in addition to the first wire lead 350 (or alternatively the second wire lead 352) of the cover control switch cord 56.

Figure 22:
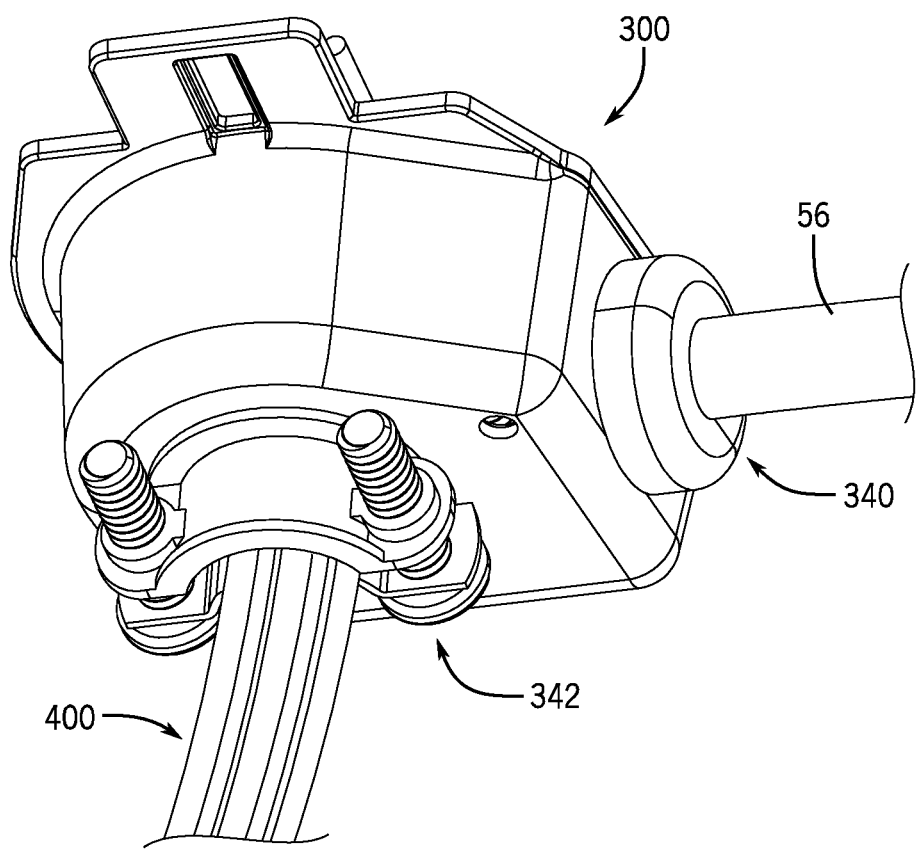
FIG. 22 is a perspective view of portions of the food waste disposer assembly of FIGS. 1 through 8 substantially corresponding to the portions shown in FIG. 10, when the food waste disposer assembly is being assembled in accordance with a method of assembly/installation so as to be coupled to a power cord rather than the Romex/BX cable.

FIG. 22 particularly illustrates a modified version of the second step of FIG. 10 when that second step is performed in relation to the power cord 400 rather than the Romex/BX cable 58. More particularly, in this modified version of the second step, the operator inserts the strain relief component (or grommet) 340 into the side orifice 322 of the terminal cover 300 and additionally inserts the cover control switch cord 56 (the end opposite the end coupled to the primary body 52) including the first and second wire leads 350 and 352 through the side orifice 322 and through the strain relief component therewithin, from the exterior of the terminal cover 300 into the interior space 312 of the terminal cover. Additionally, the operator inserts the power link coupler 342 into (or in relation to) the bottom orifice 320 of the terminal cover 300 and additionally inserts the power cord 400 (the free end opposite the end intended for coupling to a wall outlet) including third, fourth, and fifth wire leads thereof (corresponding to the third, fourth, and fifth wire leads 354, 356, and 357 of the Romex/BX cable 58) through the bottom orifice 320 and through the power link coupler (or grommet) 342, from the exterior of the terminal cover 300 into the interior space 312 of the terminal cover. Upon completion of this modified version of the second step, each of the cover control switch cord 56 and the power cord 400 are coupled to and secured relative to the terminal cover 300, in a manner such that each of the first and second wire leads 350, 352 of the cover control switch cord and the third, fourth, and fifth wire leads of the power cord 400 are positioned within the interior space 312 (again see FIG. 8).

It should further be appreciated that, subsequent to the performing of the modified version of the second step as illustrated by FIG. 22, the method of assembling the food waste disposer assembly proceeds in the same manner as described above with respect to FIGS. 11 through 20, except insofar as the method involves the power cord 400 (and associated third, fourth, and fifth wire leads) rather than the Romex/BX cable 58. Thus, in contrast to the third, fourth, and fifth steps illustrated by FIGS. 11, 12, and 13, respectively, the modified versions of those steps—and particularly the modified versions of the third and fifth steps—involve coupling of the third and fourth wire leads of the power cord 400 to the start switch interface connector 344 and the coupling of the fifth wire lead of the power cord to the second wire lead 352 of the cover control switch cord 56, by way of the wire joiner connector 346 (or alternatively the wire nut 399 as mentioned in relation to FIG. 21). Further, in contrast to the sixth step illustrated by FIGS. 14 and 15, the seventh step illustrated by FIGS. 16, 17, and 18, and the eighth step illustrated by FIG. 19, the modified versions of those steps are identical except insofar as the terminal assembly that is aligned with and coupled to the LEF 106 includes a portion of the power cord 400 rather than the Romex/BX cable 58 that is included with the terminal assembly 380. The method then again finishes with the ninth step illustrated by FIG. 20, in which the primary body 52 of the control switch mechanism 50 (e.g., the cover control switch) is attached in place with respect to the AV extension tube at the top of the food waste disposer.

It will be appreciated from the above discussion that the LEF connecting components 54 allow for either the Romex/BX cable 58 or the power cord 400 to be coupled to the start switch 388 by way of the start switch interface connector 344 and wire joiner connector 346 (or wire nut 399), depending upon the installation circumstance or environment. Also, in some installation circumstances or environment, it can be possible for a food waste disposer assembly to be coupled to a power source by way of either one of the Romex/BX cable 58 or the power cord 400, if both the Romex/BX cable is present and also a wall outlet is present. Given these considerations, it will be appreciated that in at least some circumstances or embodiments, the methods of assembly/installation of the food waste disposer assembly described above in regard to FIGS. 9-22 can include a preliminary step (prior to the first step) at which the operator determines whether installation involving the Romex/BX cable 58 or installation involving the power cord 400 is appropriate taking into account the installation circumstance, environment, or operator preference (if both the Romex/BX cable 58 and wall outlet are present). If it is determined at this preliminary step that installation involving the Romex/BX cable 58 is appropriate, then the method continues as described above in regard to FIGS. 9 through 20 (and/or FIG. 21, if the wire nut 399 is utilized instead of the wire joiner connector 346). Alternatively, if at this preliminary step, it is determined that installation involving the power cord 400 is appropriate, then the method continues with the modified versions of the steps of the process described above in regard to FIGS. 9 through 20, with those steps being modified to accommodate the power cord as shown in FIG. 22 (also, again, the wire joiner connector 346 or the wire nut 399 can be utilized depending upon the embodiment).

The present disclosure is also intended to encompass further embodiments and modified versions of the above-described embodiments in addition to the embodiments specifically described above. Among other things, although the above description relates to food waste disposers, the present disclosure is also intended to encompass embodiments relating to other types of waste disposers. Also, notwithstanding the description above regarding embodiments in which a terminal cover (or junction box) is attached to the LEF of the disposer and according to which the control/trigger switch cords and power cords enter the junction box at right angles or substantially right angles, the present disclosure is also intended to encompass other embodiments. For example, in an some alternate embodiments, both wire bundles (e.g., associated with the cover control mechanism and associated with the power cord or Romex or BX cord or cable) may be inserted straight up through the bottom of the disposer with a combined strain relief. Also, depending upon the embodiment, wire joiner connectors, standard wire nuts, or other connectors or fasteners can be employed to join the various conductors. Also, although the present disclosure envisions embodiments in which a food waste disposer assembly is coupled to a wall outlet by way of a power cord having a plug such as a NEMA 5-15 plug, the present disclosure is also intended to encompass other embodiments that include or operate in conjunction with other types of connectors, plugs, and adapters, including for example C-13 or C14 sockets or plugs.

It is specifically intended that the present invention not be limited to the embodiments and illustrations contained herein, but include modified forms of those embodiments including portions of the embodiments and combinations of elements of different embodiments as come within the scope of the following claims.

We claim:

1. A food waste disposer system comprising:
    a food waste disposer including a motor, a switch module coupled to the motor and operable to control power to the motor, and a housing including a bottom housing portion and a top housing portion, wherein the switch module and motor are supported within the housing; and
    a cover switch mechanism including a cover control switch cord, a primary body having at least one actuator and configured to be coupled to the top housing portion, and a plurality of connecting components,
    wherein the plurality of connecting components include a terminal cover configured to be coupled to the bottom housing portion and a switch interface connector coupled to the terminal cover and also configured to be coupled to the switch module,
    wherein the cover control switch cord extends between the primary body and the terminal cover, wherein a first end of the cover control switch cord extending into the terminal cover includes first and second wire leads, and wherein the first wire lead is coupled to the switch interface connector, and
    wherein the terminal cover is further configured to receive a second end of a power link therewithin, wherein the switch interface connector is configured to be coupled to at least one third wire lead of the power link, and wherein the second wire lead is configured to be coupled at least indirectly to a fourth wire lead of the power link.

2. The food waste disposer system of claim 1, wherein the power link is one of a Romex cable or a BX cable.

3. The food waste disposer system of claim 1, wherein the power link is a power cord that extends from the second end to a third end at which the power cord includes a plug suitable for being coupled to a wall outlet.

4. The food waste disposer system of claim 1, wherein the plurality of connecting components include a first wire lead connective component by which the second wire lead can be coupled to the fourth wire lead of the power link.

5. The food waste disposer system of claim 4, wherein the first wire lead connective component is either a wire joiner connector or a wire nut.

6. The food waste disposer system of claim 1, wherein the terminal cover is cup-shaped and has a bottom wall and at least one side wall extending upward from the bottom wall and configured to engage the bottom housing portion.

7. The food waste disposer system of claim 6, wherein the terminal cover includes a first orifice within the bottom wall and a second orifice within the at least one side wall, wherein the cover control switch cord extends into the terminal cover by the first orifice, and wherein the second end of the power link is received by the terminal cover by the second orifice.

8. The food waste disposer of claim 7, further comprising at least one strain relief component by which one or both of the cover control switch cord and the power link can be at least partly secured to the terminal cover, and wherein the bottom wall is substantially perpendicular to the at least one side wall.

9. The food waste disposer of claim 6, wherein the bottom housing portion includes a first orifice having a first recessed indentation, wherein the switch interface connector includes a first protrusion that is substantially complementary in shape to the first orifice, wherein the switch interface connector is able to pass into an interior cavity within the food waste disposer when the first protrusion is aligned with the first recessed indentation, and wherein the first protrusion is no longer aligned with the first recessed indentation when the switch interface connector is coupled to the switch module, such that the switch interface connector is not able to pass out of the interior cavity when the switch interface connector is coupled to the switch module.

10. The food waste disposer of claim 9, wherein the terminal cover includes a first rim extension extending from a rim of the at least one side wall positioned above the bottom wall, and further comprising a fixing screw that serves to couple the rim to the bottom housing portion and further serves to prevent the switch interface connector from being decoupled from the switch module.

11. The food waste disposer of claim 1, wherein the switch interface connector is configured to allow for electrical coupling between each of the first wire lead and the at least one third wire lead and respective terminals of the switch module, wherein a switchable electrical circuit is formed that extends between the second wire lead and the fourth wire lead as coupled by a first wire lead connective component, further extends between the second wire lead and the first wire lead by way of the cover switch mechanism, and additionally extends from the first wire lead to one or more of the at least one third wire lead at least indirectly by way of the switch interface connector, the switch module, and the motor.

12. A cover switch mechanism for implementation with a waste disposer having a motor, a switch module coupled at least indirectly to the motor, and a housing including a bottom housing portion and a top housing portion, wherein the switch module and motor are supported within the housing, the cover switch mechanism including:
- a cover control switch cord;
- a primary body configured to be coupled to the top housing portion; and
- a plurality of connecting components including:
  - a terminal cover configured to be coupled to the bottom housing portion;
  - a switch interface connector coupled to the terminal cover and also configured to be coupled to the switch module; and
  - a wire lead connection component,
- wherein the cover control switch cord extends between the primary body and the terminal cover, wherein a first end of the cover control switch cord extending into the terminal cover includes first and second wire leads, and wherein the first wire lead is coupled to the switch interface connector, and
- wherein the terminal cover is further configured to receive a second end of a power link therewithin, wherein the switch interface connector is configured to be coupled to at least one third wire lead of the power link, and wherein the wire lead connection component is configured to couple the second wire lead with a fourth wire lead of the power link.

13. The cover switch mechanism of claim 12, wherein the power link is one of a Romex cable or a BX cable.

14. The cover switch mechanism of claim 12, wherein the power link is a power cord that extends from the second end to a third end at which the power cord includes a plug suitable for being coupled to a wall outlet.

15. The cover switch mechanism of claim 12, wherein the first wire lead connective component is either a wire joiner connector or a wire nut, and the cover switch mechanism is provided as a kit that is supplemental to the food waste disposer.

16. The cover switch mechanism of claim 12, wherein the terminal cover is cup-shaped and has a bottom wall and at least one side wall extending upward from the bottom wall and configured to engage the bottom housing portion, wherein the terminal cover includes a first orifice within the bottom wall and a second orifice within the at least one side wall, wherein the cover control switch cord extends into the terminal cover by way of the first orifice, and wherein the second end of the power link is received by the terminal cover by way of the second orifice.

17. The cover switch mechanism of claim 16, wherein the plurality of connecting components additionally include at least one strain relief component, and wherein the bottom wall is substantially perpendicular to the at least one side wall.

18. A method of installing a food waste disposer system, the method comprising:
- providing the food waste disposer system to an installation environment, wherein the food waste disposer system includes a housing, a switch module, and a motor, wherein the switch module and motor are supported at least indirectly upon the housing;
- providing a cover switch mechanism including a cover control switch cord, a primary body configured to be coupled to the top housing portion, and a plurality of connecting components, wherein the plurality of connecting components include a terminal cover configured to be coupled to the bottom housing portion, a switch interface connector, and a wire lead connection component;
- causing the cover control switch cord and a power link respectively to extend between a first region exterior of the terminal cover and a second region within the terminal cover by way of first and second orifices, respectively, of the terminal cover, so that each of respective first ends of the cover control switch cord and the power link extends into the second region;
- coupling respective first wire leads provided at the respective first ends of the cover control switch cord and the power link to respective ports of the switch interface connector;
- coupling together, at least indirectly, respective second wire leads provided at the respective first ends of the cover control switch cord and the power link, respectively;
- assembling a terminal assembly including the terminal cover, the switch interface connector, and the first ends of the cover control switch cord and the power link in relation to a bottom portion of the housing, wherein the assembling includes coupling the switch interface connector to the switch module; and
- connecting the primary body of the cover switch mechanism to a top portion of the housing.

* * * * *